Nov. 17, 1942.   A. LANGDON ET AL   2,302,038
SWITCH AND SIGNAL CONTROL SYSTEM FOR RAILROADS
Filed Dec. 26, 1940   10 Sheets-Sheet 1
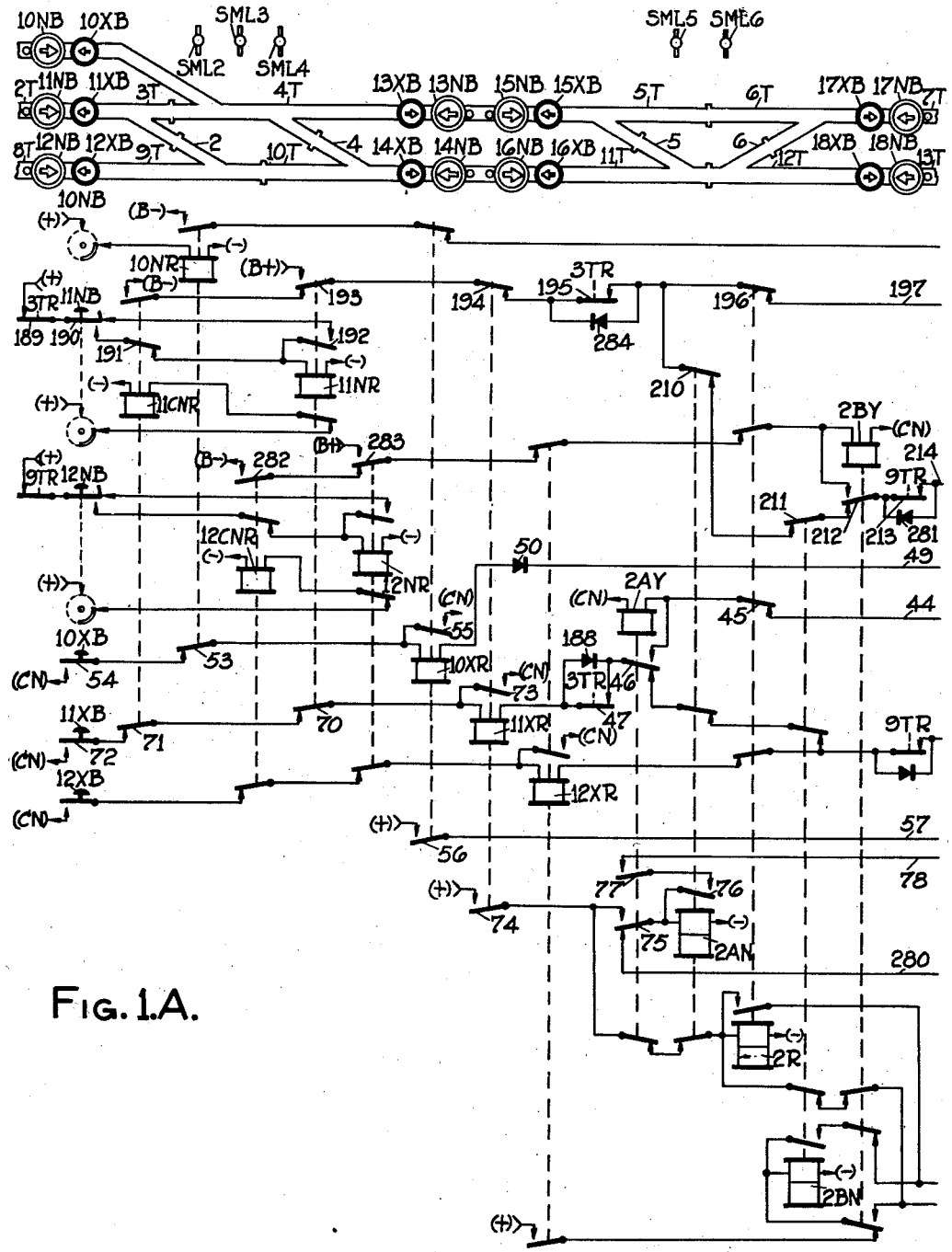
FIG. 1.A.
INVENTORS
A. Langdon and F.B. Hitchcock
BY
Neil W. Preston
THEIR ATTORNEY Nov. 17, 1942.    A. LANGDON ET AL    2,302,038
SWITCH AND SIGNAL CONTROL SYSTEM FOR RAILROADS
Filed Dec. 26, 1940    10 Sheets-Sheet 2

INVENTORS
A.Langdon and F.B.Hitchcock
BY Neil W. Preston
THEIR ATTORNEY

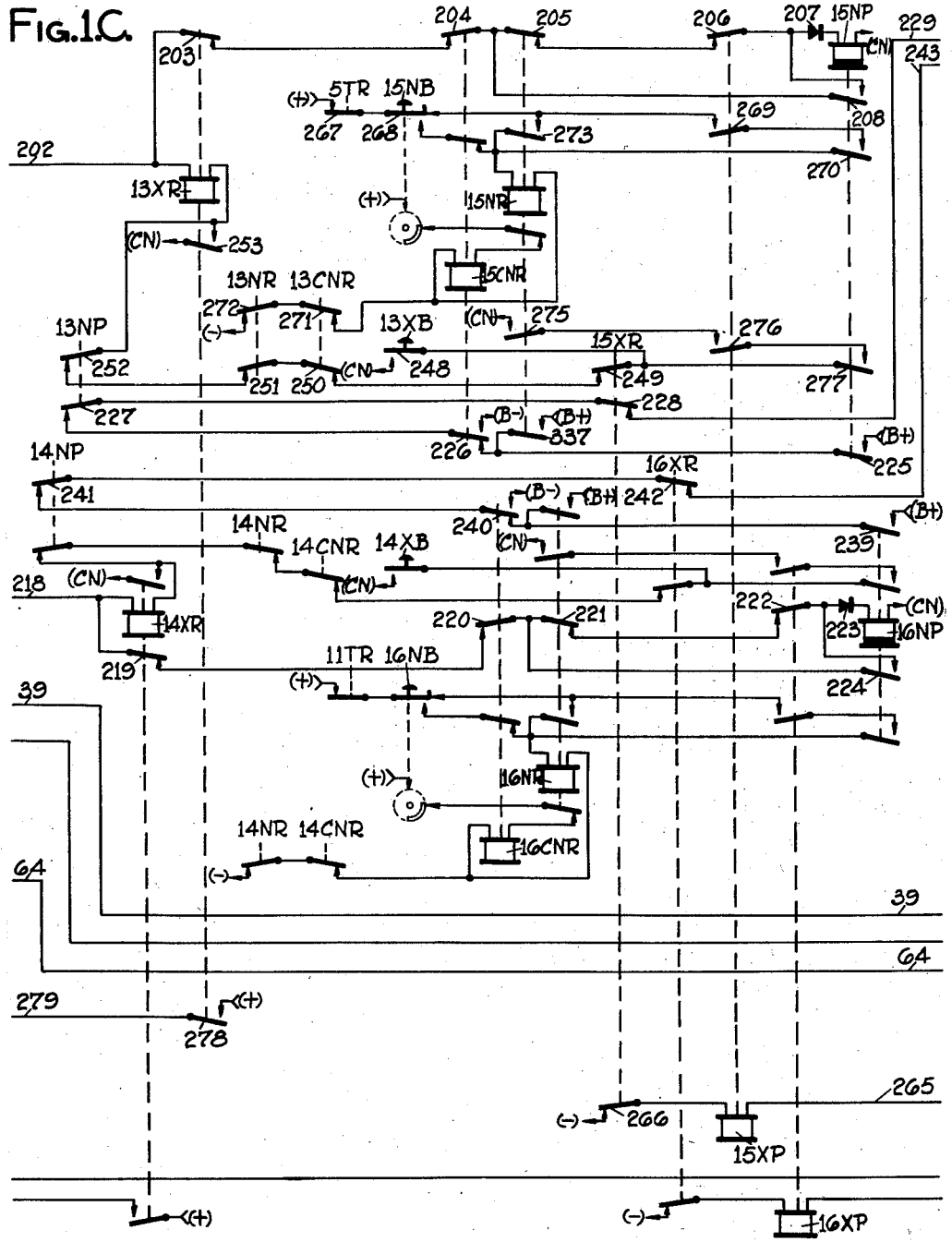

Fig. 1D.

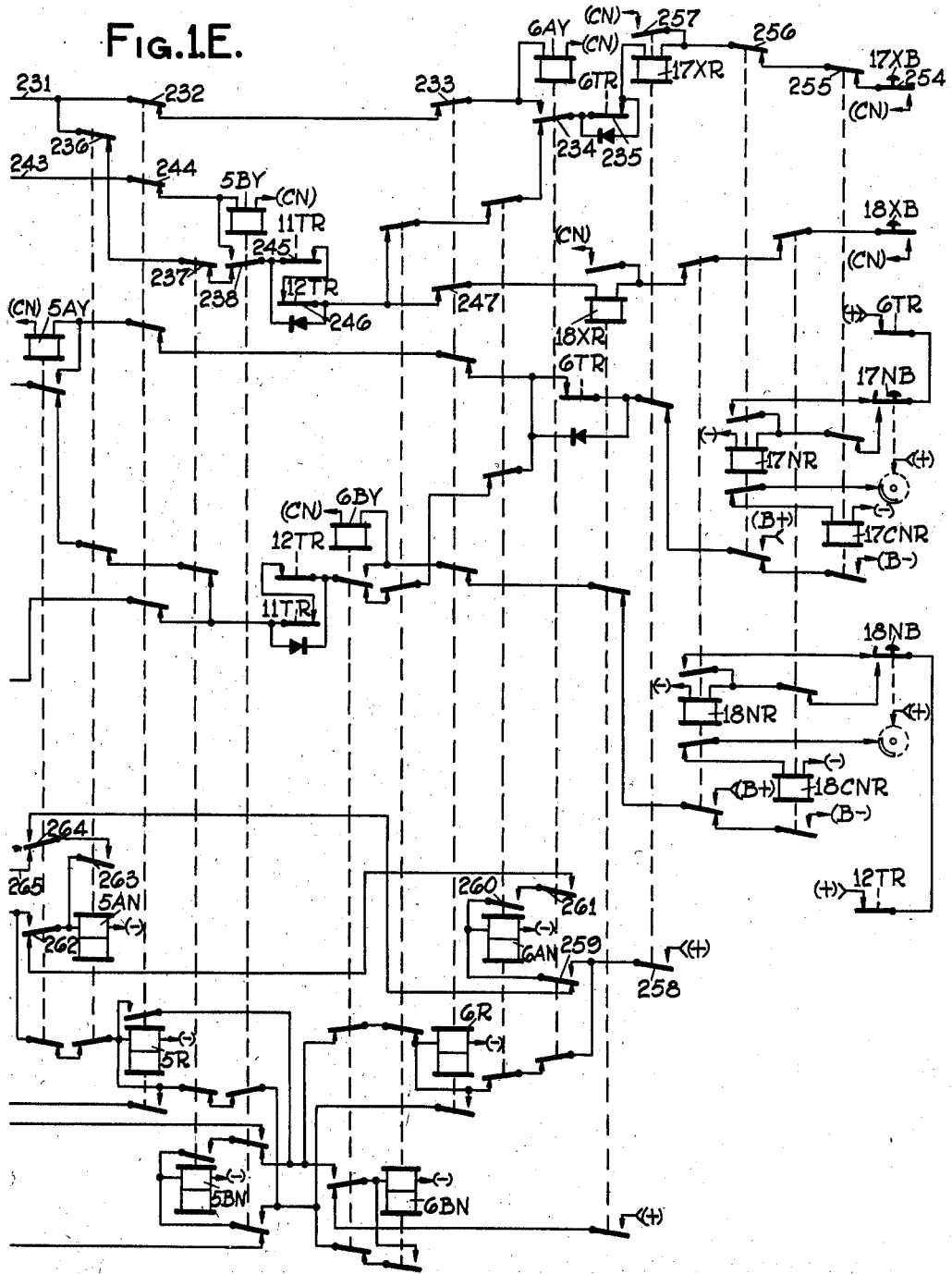

INVENTORS
A. Langdon and F. B. Hitchcock
BY Neil W. Preston
THEIR ATTORNEY

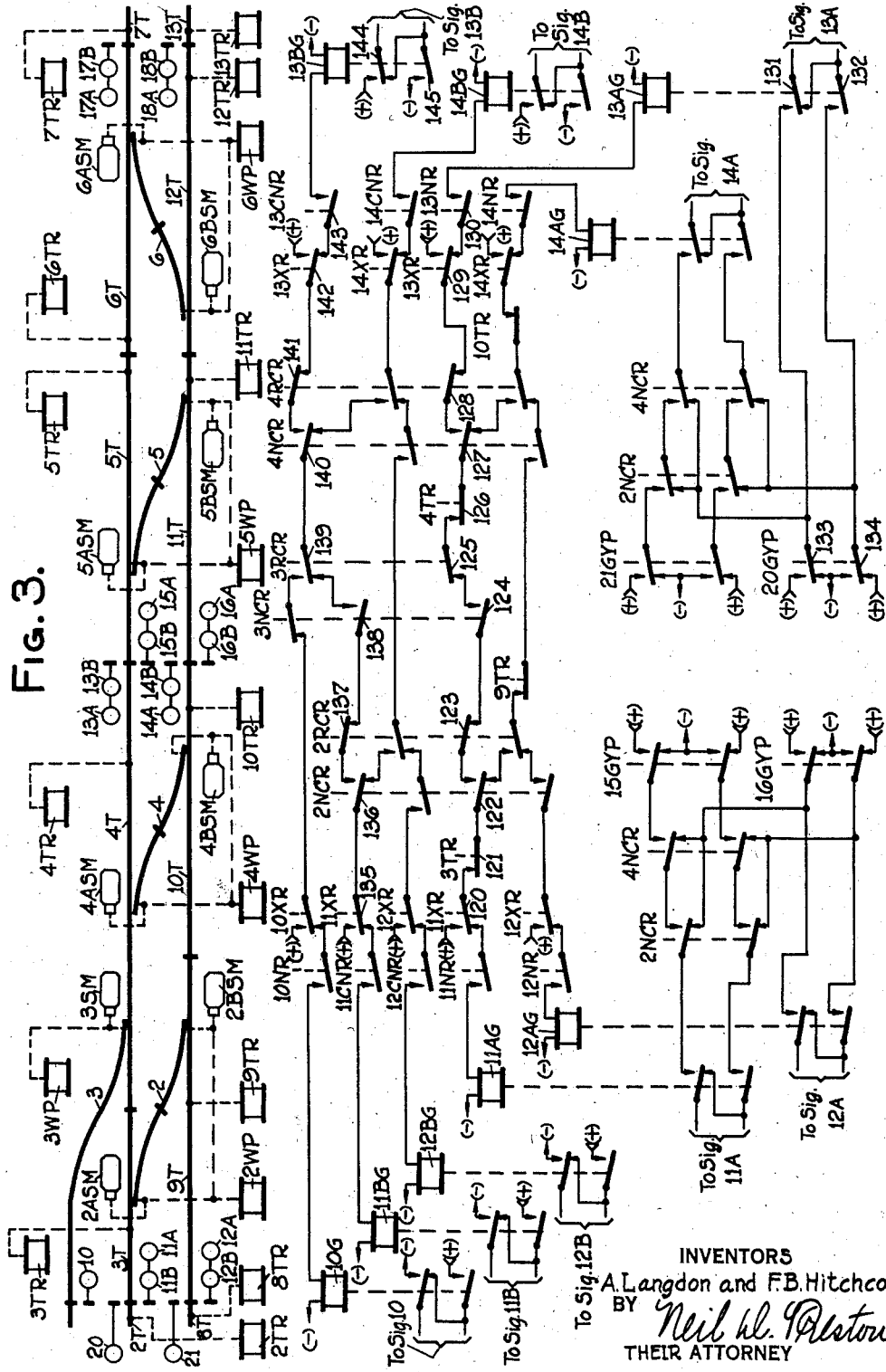

Nov. 17, 1942. A. LANGDON ET AL 2,302,038
SWITCH AND SIGNAL CONTROL SYSTEM FOR RAILROADS
Filed Dec. 26, 1940 10 Sheets-Sheet 8
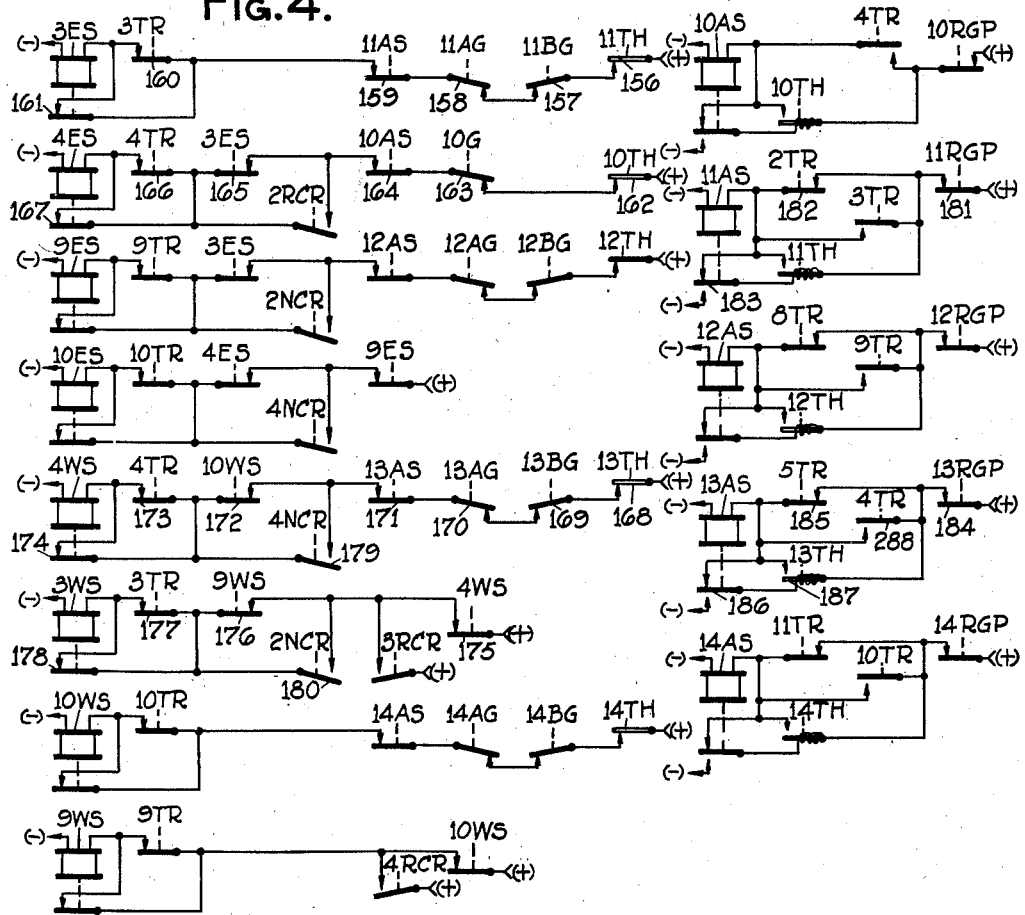
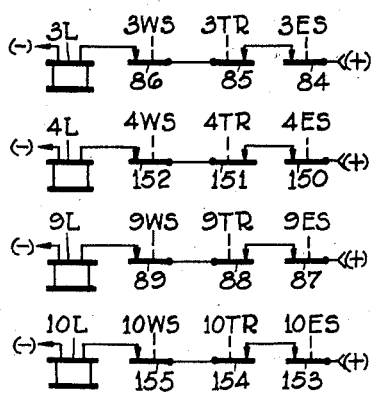
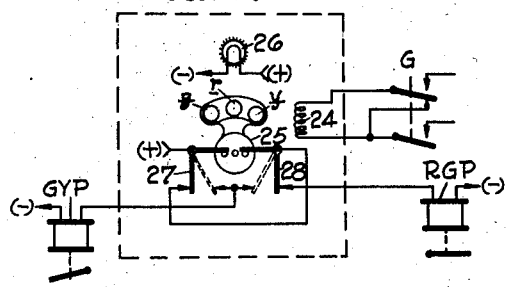
INVENTORS
A.Langdon and F.B.Hitchcock
BY
THEIR ATTORNEY Nov. 17, 1942.  A. LANGDON ET AL  2,302,038
SWITCH AND SIGNAL CONTROL SYSTEM FOR RAILROADS
Filed Dec. 26, 1940  10 Sheets—Sheet 10
FIG. 7.B.
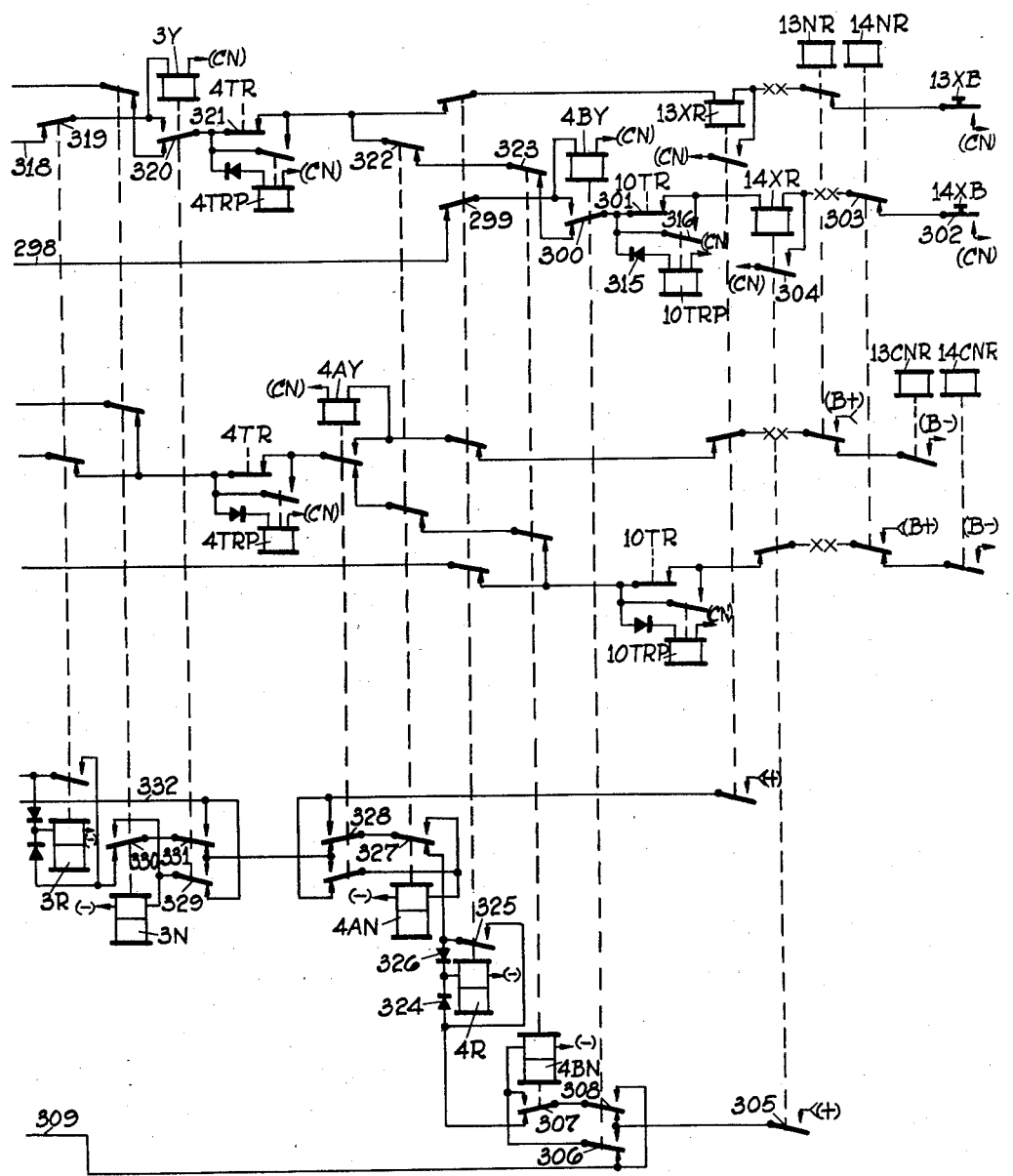
INVENTORS
A.Langdon and F.B.Hitchcock
BY
THEIR ATTORNEY

UNITED STATES PATENT OFFICE 2,302,038

SWITCH AND SIGNAL CONTROL SYSTEM FOR RAILROADS

Andrew Langdon, Brighton, and Forest B. Hitchcock, Greece, N. Y., assignors to General Railway Signal Company, Rochester, N. Y.

Application December 26, 1940, Serial No. 371,694

18 Claims. (Cl. 246—134)

This invention relates to switch and signal control systems for railroads, and it more particularly pertains to a system where the manipulations of the control buttons on a control panel are of the entrance-exit type for controlling the power operation of track switches to establish different routes and thereafter cause the clearing of the signals governing such routes.

In a system of the entrance-exit type, the control panel preferably comprises a miniature track diagram with suitable control buttons, or the like, located at points on the track diagram corresponding to the signal locations constituting the entrance and/or exit ends of the various routes. To establish any given route, all that is required is the operation of a control button for the entrance end of that route followed by the actuation of a control button for the exit end of such route, the track switches being operated to positions as required followed by the clearing of the governing signal for that route. It is to be understood that in such a system auxiliary control levers may be provided to individually control the various track switches under certain emergency conditions.

The manipulation of the control buttons to designate the entrance and exit ends of any desired route causes the automatic selection and operation of all the track switches or cross-overs involved in such route. This automatic operation of the system is effected by suitable route establishing means comprising in the system of the present invention initiation and completion circuits. The operation of a button to designate the entrance end of a route energizes the initiating circuits to preselect the positions of the various switches for each of the available routes originating at such entering signal locations; while the subsequent operation of a control button to designate the exit end of any given one of such available routes originating at the designated entrance point energizes the completion circuits to energize suitable normal and reverse control relays for the various switches in such given route in accordance with the preselection operation.

The application of such a system as above outlined, to a terminal or large interlocking plant involves in effect the provision of a plurality of interlocking systems which must be inter-related so as to establish what are conveniently termed "through routes" extending through the entire interlocking plant.

Thus, for convenience in the discussion of the present invention, any group of track switches and crossovers which provide inter-related routes and which are located between or bounded by their governing signals may be termed an "interlocked group," and a large terminal usually comprises a plurality of such interlocked groups.

As above mentioned, a terminal or interlocking plant may include one or several of these interlocked groups dependent upon the arrangement and size of the track layout and the movements of traffic to be made thereover; and some of such interlocked groups may be located end-to-end so as to provide one or more "through routes" past the signals of one or more interlocked groups, which signals then become in effect intermediate signals with respect to any given through route.

When an entrance-exit type of control system is applied to a terminal or interlocking plant involving several interlocked groups which may provide various through routes, it is desirable to have the system so organized as to effect the establishment of a through route by merely actuating the control button for the entering signal location followed by the actuation of the control button for the exit end of a through route without manipulating the control buttons for the intervening intermediate signal locations.

Such a switch and signal control system has been disclosed, for example, in the prior application of A. Langdon, Ser. No. 119,641, filed January 8, 1937; in the patent granted to Wight and Langdon, Patent No. 2,219,502, dated October 29, 1940; and also in the prior application of Judge, Ser. No. 330,535, filed April 19, 1940. The present invention is in the nature of an improvement in the means employed for accomplishing the desired functions and results in such a type of system providing through route control; and no claim is made herein to anything disclosed in such prior applications.

One object of the present invention is to provide a system of this character, where the designation of an entering signal location preselects the positions of those switches in all of the various available routes and through routes originating at such entrance point in such a manner that this preselection operation effected by the energization of initiating circuits will not extend over the initiating circuit for a route occupied by a train.

Another object of the present invention is to provide such limitation of the preselection operation to the unoccupied routes when an entrance point is designated to govern a high speed signal or a semi-automatic dwarf signal, but to permit the preselection operation for all routes in any given interlocked group irrespective of their occupied conditions when the entrance point is designated to govern a call-on or low speed signal. This preselection operation for a low speed signal is not effective for the through routes originating at such entering signal location, as the call-on signals thus controlled are used to facilitate switching train movements within their own interlocked group and are not intended to govern through train movements.

Another object of the invention is to provide the above mentioned feature in such a manner that the same initiating circuits can be employed for the preselection operation in response to the designation of an entrance point either for a call-on signal or a high speed signal, to thereby simplify the apparatus employed as well as rendering the organization more economical.

A further object of the invention is to so organize the system that when a signal location is designated as an entrance point for a high speed or semi-automatic dwarf signal, that the preselection operation will extend to only those exit points which are included in through routes, and the subsequent designation of some exit point to which a through route does not extend fails in the establishment of such route, while on the other hand the manipulation of the control button for such entrance signal location in a manner characteristic of a call-on or low speed signal permits that entering signal to be cleared for any possible route within its own interlocked group.

A further feature of the invention is to effect the above mentioned objects in such a way as to give a predetermined preference between the several optional or alternative routes afforded by the track layout between the same entrance and exit points irrespective of whether such entrance and exit points are in the same interlocked group or are for some through route afforded by the track layout. In the event the superior or preferred alternative route cannot be established due to the establishment or occupancy of a conflicting route, then the next more inferior alternative route will be automatically established.

Other objects and characteristic features of the invention relate to the means employed to enable the operator to cancel a route partially or completely set up by merely actuating in a distinctive manner the control button at an entrance end of such route; to provide for individual operation of any switch by the manipulation of an auxiliary switch control lever; and to so organize the system that the display of suitable desirable indications may be readily effected by means not disclosed in the present application but disclosed in prior applications such as in the application of T. J. Judge, Ser. No. 330,535, filed April 19, 1940.

The nature of the invention and complexity of the structural organization and its mode of operation makes it difficult to define the invention completely and yet briefly; therefore other various characteristic features, attributes, and advantages of the system embodying this invention will be discussed in detail as the description progresses.

The accompanying drawings illustrate conventionally and diagrammatically a specific embodiment of the invention applied to a typical or representative track layout, the parts and circuits illustrated being arranged in a manner to facilitate an explanation and an understanding of the invention rather than to show specifically how the various relays and devices may be arranged and structurally organized in actual practice, and various symbols and nomenclatures are employed to simplify this diagrammatic illustration.

Figure 1D:
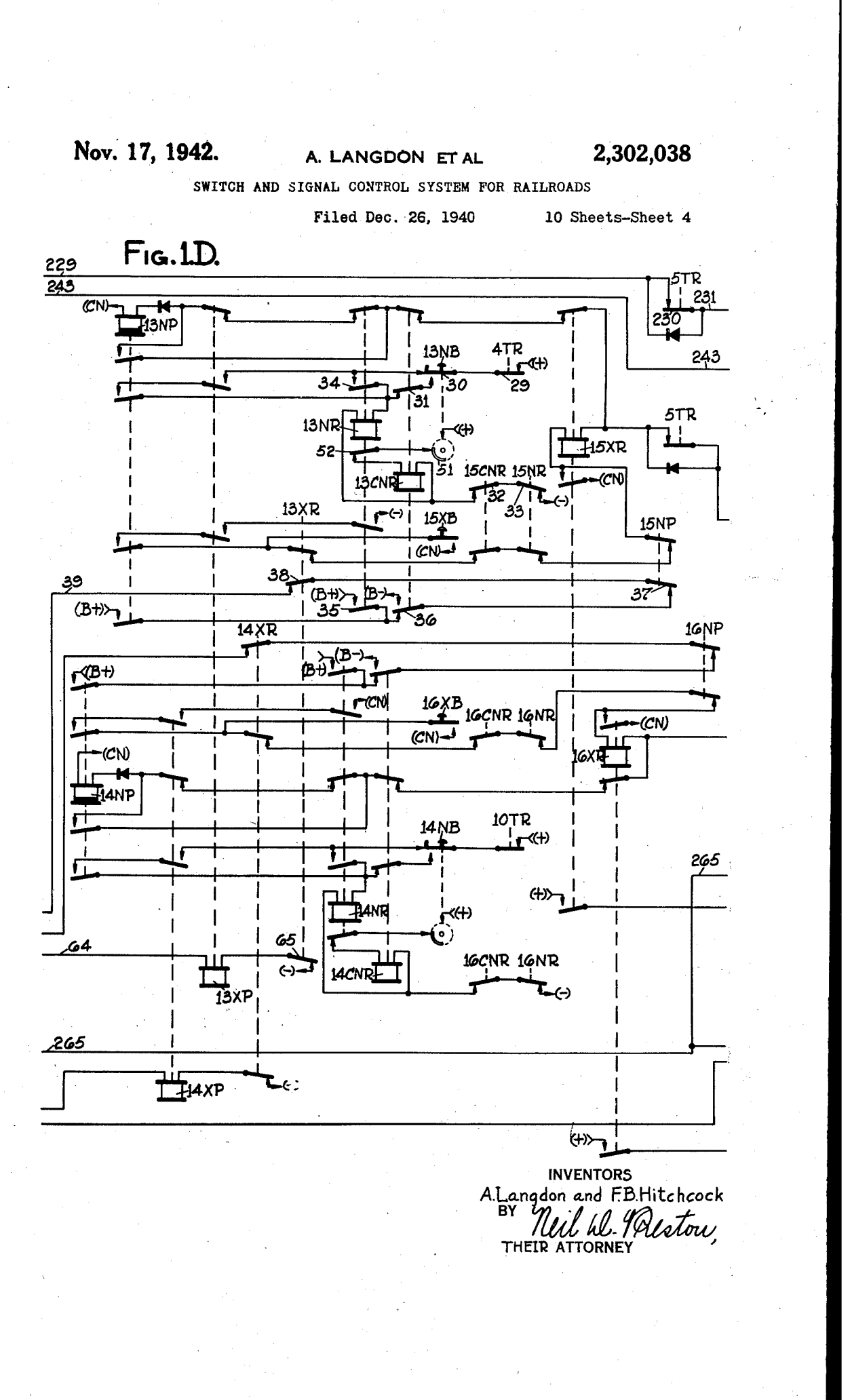

Figs 1A, 1B, 1C, 1D and 1E, when placed side by side, show diagrammatically a control panel having a track diagram together with the associated route establishing means for a track layout corresponding to the track diagram and typical of the various arrangements of signals and crossovers that may be found in actual practice;

Fig. 2 shows a typical switch control circuit which illustrates how each of the track switches of the track layout chosen for the present embodiment may be controlled either by the automatic operation of the route establishing means or by individual auxiliary lever operation;

Fig. 3 shows the track layout of the interlocking plant chosen as typical for the purpose of disclosing the present invention, and for which the miniature track diagram of Fig. 1A is provided, and this Fig. 3 also shows the signal selecting circuits provided to select and control the signals in accordance with the route establishing means and in accordance with traffic conditions in the track layout.

Fig. 4 shows the directional stick relay circuits with associated thermal relays for providing sectional release locking for the track switches as well as the approach locking circuits with suitable time release means;

Fig. 5 shows the locking relays for the various switches of the track layout;

Fig. 6 illustrates a typical signal mechanism of the search-light type and the associated repeating relays.

Figs. 7A and 7B illustrate a modified form of the invention.

Figure 1B:
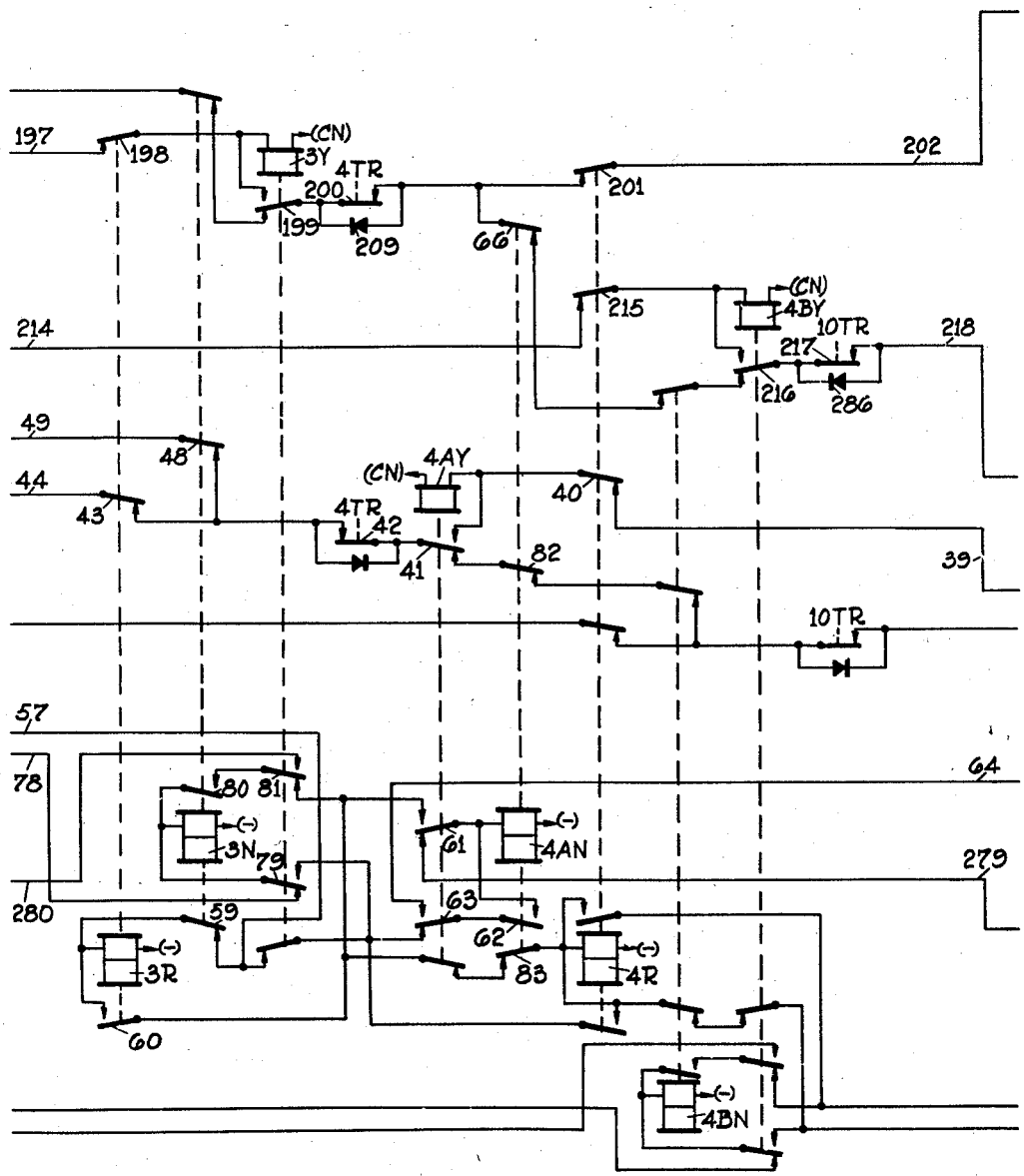

In order to facilitate the disclosure of the present invention, the various parts and circuits have been shown diagrammatically and certain conventional illustrations have been employed. Thus, the various devices, relays and their contacts are illustrated in a conventional manner, certain circuit details well known to those familiar with the art are merely indicated by dotted lines; and symbols are used to indicate connections to the terminals of batteries, or other sources of electric current, instead of showing all of the wiring connections to these terminals.

The symbols (+) and (—) are employed to indicate the positive and negative terminals respectively of suitable batteries or other sources of direct current, and the circuits with which these symbols are used always have current flowing in the same direction as graphically illustrated by the arrow heads and tails. If alternating current is used with these circuits instead of direct current, the symbols shown are to be considered as representative of the instantaneous relative polarities of such current.

The symbols (B+) and (B—) are employed to indicate the positive and negative terminals respectively of suitable batteries or other sources of direct current having a central or mid-tap indicated by the symbol (CN). The sources thus indicated are used to provide for the reversal of current flow in the circuits with which they are employed, and when such sources are used in connection with line circuits, it is assumed that the mid-taps (CN) are connected over suitable common return line wires.

GENERAL ORGANIZATION OF THE SYSTEM

It is of course well understood that the switch and signal control system of the present invention will govern the power operation of the switches and signals at the track layout in the field from a central tower or control office. The control office will include a suitable control machine provided in accordance with the present invention, which control machine is directly connected to the various power operated track switches and signals by suitable line wires. Inasmuch as the distribution of the apparatus between the control office and the track layout would in practice vary in accordance with the different circumstances involved, no effort has been made to distinctly point out where the dividing line exists between the field and control office apparatus.

However, it may be well to state that direct line wire control is contemplated and that most of the apparatus is located in the control office with line wires extending to the switches and signals. On the other hand, much of the apparatus might well be located in a bungalow adjacent the track layout and suitable direct line wires or code type communication system be used to connect the control machine with such bungalow. Such a code type system has been disclosed, for example, in the prior patent of Preston and Hitchcock, Patent No. 2,129,183, dated September 6, 1938. This has been pointed out for the purpose of having it understood that the features of the present invention may be applied to any switch and signal control system of the entrance-exit type irrespective of the type of system employed to communicate between the control office and the track layout.

Track layout (Fig. 3)

An interlocking plant may include one or several interlocked groups, it being understood that an interlocked group comprises one or more track switches for setting up different routes together with signals for governing traffic thereover. The track layout of Fig. 3 illustrates an interlocking plant having two such interlocked groups located on the main line of a double track railroad with automatic block signals assumed to be outside of the yard limits. It is of course to be understood that the present invention may be practiced without the associated automatic signal system outside of the interlocking plant, and it is also to be understood that the present invention may be applied to an interlocking plant having many more interlocked groups, the present disclosure serving to show the manner in which two adjoining interlocked groups are inter-related which inter-relation may be considered typical of the inter-relation for any other two adjoining interlocked groups.

With reference to Fig. 3 of the accompanying drawings, the track layout includes crossovers 2, 4, 5 and 6 as well as a single switch 3. Each track switch is assumed to be equipped with a power operated switch machine SM and a crossover usually has a power operated switch machine for each of its opposite ends. These switch machines may be of any suitable character, such for example, as disclosed in the patent to W. K. Howe, Patent No. 1,466,903, dated September 4, 1923. Each switch machine SM is controlled in a manner suitable for remote control by a secondary switch control relay WZ (see Fig. 2) through suitable overload protection and the like, such as shown, for example, in the patent to W. H. Hoppe et al., Patent No. 1,877,876, dated September 20, 1932. It will be assumed, for convenience, that any given secondary switch control relay WZ of the present disclosure is to be used for remotely controlling the polar relay CR, illustrated in the Hoppe et al. patent, which relay CR is local to its associated switch machine.

Figure 2:
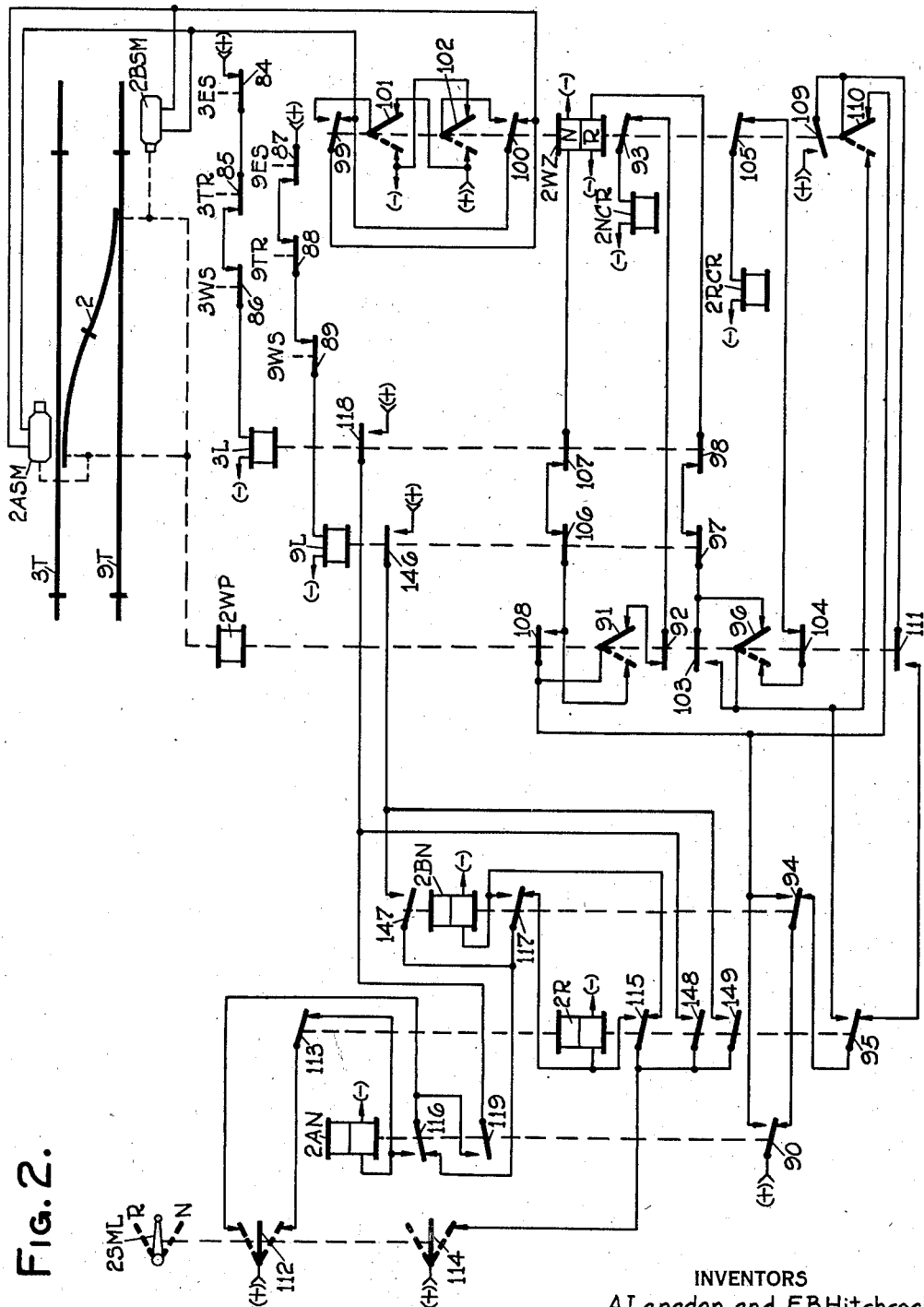

The control of the switch machines of a crossover, such as crossover 2 for example, has been typically illustrated in Fig. 2 of the accompanying drawings and each such track switch or crossover has its position and locked condition indicated by a relay WP which is suitably controlled to one energized polar position or the other dependent upon the normal or reverse position and locked condition of its associated switch points. This control of the relay WP for any switch is effected through the use of suitable point detector contacts controlled as disclosed for example in the patent to C. S. Bushnell, Patent No. 1,517,236, dated November 25, 1924. In the case of a crossover of the usual type, each end of the crossover has its associated point detector mechanism and the circuit for the single switch position repeating relay WP is suitably selected through the contacts of both mechanisms.

Suitable wayside signals are shown in Fig. 3 for governing the high speed traffic and also for facilitating switching train movements in the plant. Although any type of signals may be employed giving suitable indications appropriate for the type of traffic to be governed, it has been assumed for the purpose of the present disclosure that search-light signals are employed and that high speed traffic may move in either direction on both tracks. Thus, high speed signals 11A, 12A, 15A and 16A are shown for governing high speed traffic to the right; while signals 17A, 18A, 13A, 14A, 20 and 21 are for governing high speed traffic to the left. Low speed traffic to the right is governed by signals 10, 11B, 12B, 15B and 16B; while low speed traffic to the left is governed by signals 17B, 18B, 13B and 14B. Signals 20 and 21 are assumed to be high speed automatic signals governing traffic into automatic block signal territory to merely illustrate the manner of relating an interlocking plant of the present invention to such territory. The high speed signals are so controlled as to indicate clear (green), caution (yellow), and stop (red), while the low speed signals are arranged to indicate caution (yellow), and stop (red). Each of these signals has been assumed to be of the type disclosed, for example in the patent to O. S. Field, Patent No. 1,835,150, dated December 8, 1931, and one such mechanism has been diagrammatically illustrated in Fig. 6 of the drawings.

Referring to Fig. 6, the signal mechanism includes an operating winding 24 which may be energized with one polarity or the other to move its rotor 25 to the right or to the left from a central normal deenergized position. When the rotor 25 is in a neutral deenergized position, a red color screen or roundel r is positioned in front of the illuminated lamp 26 so as to cause the optical arrangement of the signal to display a red indication. When the winding 24 is energized with negative potential on its upper terminal, the rotor is moved counterclockwise to position a yellow roundel y in front of the lamp 26; while if positive potential is applied to the upper terminal of the winding 24, the rotor 25 is moved in a clockwise direction to position a green roundel g in front of the lamp 26 to give a green indication.

When the signal is deenergized the contacts 27 and 28 assume normal positions as shown for energizing the red repeater relay RGP associated therewith over an obvious circuit; but, if the rotor 25 is moved in a clockwise direction the contact 27 is opened, or if the rotor is moved in a counterclockwise direction the contact 28 is open, so that the relay RGP is deenergized whenever the signal displays anything other than a red indication. When the signal displays either a green or a yellow indication, the contacts 27 or 28 are moved to operated positions respectively, in which obvious circuits are closed for the green and yellow repeater relay GYP.

Each of these signal mechanisms is controlled by its associated signal control relay G, as for example, the signal 10 is controlled by a signal control relay 10G, signal 11A is controlled by relay 11AG, while signal 11B is controlled by relay 11BG. The circuits for these various signal control relays G have been shown in Fig. 3; while the typical manner in which such a relay controls its signal has been shown in Fig. 6. However, these connections between the various signal control relays G and their signals has been indicated by suitable legends in Fig. 3.

It will also noted that the signal control circuits and signal control relays G shown in Fig. 3 are for the signals of the left-hand interlocked group of the track layout, it being understood that similar signal control relays and associated circuits would also be provided for the right-hand interlocked group.

The track layout of Fig. 3 is also assumed to be provided with suitable detector track sections having the usual track relays and track batteries, but for convenience the various track sections have merely been designated by suitable nomenclature such as sections 2T, 3T, 4T, 5T, etc., and each of these sections are assumed to have a corresponding track relay, such as track relays 2TR, 3TR, 4TR, 5TR, etc. It is contemplated that suitable detector, approach and sectional rear release route locking will be provided, such as disclosed in the prior art, as for example, in the prior patent of C. F. Stoltz, No. 2,125,511, dated April 26, 1938, and also in the patent granted to Larry and Langdon No. 2,125,242, dated July 26, 1938. Such typical sectional rear release locking and approach locking has been shown for convenience in Fig. 4.

*Control office apparatus*

With reference to Fig. 1A, it is contemplated that the control machine has a control panel with a track diagram located thereon corresponding to the actual track layout of Fig. 3. There is also assumed to be suitable means effective, when a route is established, to illuminate corresponding portions of the track diagram. Suitable control buttons of the self restoring push button type, such as shown for example, in the prior application of J. F. Merkel, Ser. No. 158,720, filed August 12, 1937, are located at points on the track diagram corresponding to the various signal locations in the actual track layout. Each of these control buttons is assumed to be of the spring return type, and so constructed as to be capable of being pulled outwardly to an off normal position as well as being capable of being depressed to an operated position. Certain of the buttons, such as where call-on or low speed signals are also provided, are arranged to be rotated to right or left-hand operated positions from which they must be manually restored to normal. These control buttons are suitably designated 10NB, 11NB, 12NB, etc. to indicate that such buttons are associated with the signal locations 10, 11 and 12 for designating such locations as entrance points, and suitable arrows are located thereon to indicate the direction of traffic governed by the corresponding signals. It is also assumed that the signal indicator lamps are located within the entrance buttons NB, but such indicators have not been shown for the sake of simplicity.

Other control buttons of the self-restoring push button type, such as 10XB, 11XB, 12XB, etc. are provided to designate the exit ends of the various routes and these buttons govern traffic in directions indicated by the arrows located thereon. The switches and signals are suitably identified on the control panel by letters or numbers, or other designations, which will provided ready means of reference for the operator.

Each of the track switches also has an associated auxiliary control lever SML on the control panel. These levers have been shown in Fig. 1A, but only a typical lever 2SML and its associated control circuits for crossover 2 has been shown in Fig. 2.

The control buttons for each of the entrance and exit signal locations have associated therewith suitable relays for controlling the route establishing means. More specifically, each entrance button NB has associated therewith an entrance relay NR, and if such entrance button is to be used to designate an entrance signal location as either a high speed or a low speed entering signal location, then two such entrance relays are provided and are respectively designated NR and CNR. For example, the button 11NB has associated therewith relays 11NR and 11CNR. Each exit button XB has associated therewith an exit relay XR. For example, the button 10XB has associated therewith the relay 10XR.

The route establishing means of Figs. 1A to 1E includes primary switch control relays and preselecting relays for each of the track switches and crossovers. For example, the switch 3 has associated therewith the preselecting relay 3Y and the primary switch control relays 3N and 3R, or in other words, three relays are associated with the single switch 3. On the other hand, the crossover 2 has the preselecting relays 2AY and 2BY associated therewith as well as the primary switch control relays 2AN, 2R and 2BN, or in other words, each crossover requires five such relays.

For the purpose of effecting the through route control provided by the present invention there are relays NP and XP associated with the signal locations which may become intermediate signal locations in some through route.

*Route establishing means (Figs. 1A—1E)*

When an operator desires to establish a route, he actuates the entrance button NB for the entering signal location which causes the entrance relay NR or CNR for that location to be picked up which in turn applies energy to the initiating circuits for each of the routes originating at that signal location.

The energization of the initiating circuits by the picking up of the entrance relay NR or CNR causes the preselection of the trailed switches in such routes by the selective energization of relays AY and/or BY as the case may be. Any one of these routes that is available for use may then have its exit relay XR picked up by the actuation of its exit button XB.

The picking up of the exit relay XR for the exit end of any given available route having its entrance relay NR picked up causes energy to be applied to the completion network for energizing the primary switch control relays over completion circuits as required to establish that given route, and in accordance with the preselection operation effected by the energization of the relays AY and BY.

In general, the route establishing means comprises a network of initiating circuits for both directions, that is, there is an initiating network for traffic to the right which has feed points for each of the signal locations governing traffic to the right, and similarly there is an initiating network for traffic to the left having feed points for each of the signal locations governing traffic to the left.

There are completion circuits for both directions of traffic each having feed points at the signal locations corresponding to the exit ends of the various routes, but the circuits are so organized and inter-related as to employ but one winding for each of the primary switch control relays.

Following the operation of the track switches of any given route having its entrance and exit ends designated, the signal at the entrance end of such route is cleared to allow the passage of a train. The signal control circuits for the left-hand interlocked group are shown in Fig. 3 of the drawings, and are so organized, that not only does each track switch of any given route have to be in a proper position in correspondence with its individual control, but all of the track switches must have properly responded to conform to the route having its entrance and exit relays picked up.

We will now consider in detail the manner in which the system of the present invention responds to the actuation of entrance and exit buttons NB and XB to effect the establishment of a route between the corresponding signal locations.

*Entrance operation*

With the system in the normal condition illustrated in the drawings, the pushing of an entrance button, such as button 13NB (see Fig. 1D), causes its associated entrance relay 13NR to be picked up by reason of a circuit closed from (+), through a circuit including front contact 29 of track relay 4TR, contact 30 of entrance button 13NB in a depressed position, back contact 31 of entrance relay 13CNR, windings of relay 13NR, back contact 32 of entrance relay 15CNR, back contact 33 of entrance relay 15NR, to (—).

As soon as the entrance relay 13NR is picked up, it closes a stick circuit from (+), through a circuit including front contact 29 of track relay 4TR, entrance button contact 30 either in a depressed position or in a normal position, front contact 34 of entrance relay 13NR, windings of entrance relay 13NR, back contact 32 of entrance relay 15CNR, back contact 33 of entrance relay 15NR, to (—). This stick circuit maintains the entrance relay 13NR energized dependent upon the track relay 4TR, although the operator releases the entrance button 13NB. In other words, the entrance of a train onto the track section 4T immediately in advance of the signal 13 automatically restores the entrance relay 13NR to a deenergized condition. Also, the operator may manually restore the entrance relay 13NR by merely pulling the entrance button 13NB so as to open the contact 30 included in its stick circuit.

This actuation of the entrance button 13NB to a depressed position from which it is self-restoring, is for the clearing of the upper arm signal 13A, so that the entrance relay 13NR applies positive potential (B+) through its front contact 35 to the initiating circuits for all of the routes originating at that signal location.

On the other hand, if the operator desires to clear the lower arm or low speed signal 13B instead of signal 13A, he rotates the entrance button 13NB in a clockwise direction to close an energizing circuit for the entrance relay 13CNR from (+), through a circuit including contact segment 51 of entrance button 13NB in an operated position, back contact 52 of relay 13NR, windings of entrance relay 13CNR, back contact 32 of entrance relay 15CNR, back contact 33 of entrance relay 15NR, to (—). This energization of the entrance relay 13CNR causes negative potential (B—) to be applied to the initiating circuits for all of the routes originating at corresponding signal locations.

It is noted that relays 13NR and 13CNR are interlocked by contacts 31 and 52 so that only one of these relays can be energized at any one time.

*Preselecting and conditioning operation*

The picking up of the entrance relay 13NR applies energy (B+) to the initiating circuits for each of the routes originating at the signal 13. More specifically energy is applied from (B+), through a circuit including front contact 35 of relay 13NR, back contact 36 of relay 13CNR, back contact 37 of relay 15NP, back contact 38 of relay 13XR, wire 39 (Figs. 1D, 1C to 1B), back contact 40 of relay 4R, windings of relay 4AY, to (CN).

The response of the relay 4AY passes energy on from its right-hand terminal through its front contact 41, front contact 42 of track relay 4TR, back contact 43 of relay 3R, wire 44, back contact 45 of relay 2R, windings of relay 2AY, to (CN).

The response of the relay 2AY to such energization passes energy on from its right-hand terminal through its front contact 46, front contact 47 of track relay 3TR, to the right-hand terminal of the exit relay 11XR. Thus, the relay 11XR is conditioned for energization if its exit button 11XB is actuated.

The picking up of the relay 4AY also passes energy from its right-hand terminal through its front contact 41, front contact 42 of track relay 4TR, back contact 48 of relay 3N, wire 49, to the rectifier unit 50. But the rectifier unit 50 is so located in the circuit as to prevent the flow of positive energy (B+) to the exit relay 10XR. In other words, the exit relay 10XR is not conditioned for energization if the exit button 10XB is operated, because the energy applied upon the actuation of the entrance button 13NB is of a polarity associated with high speed routes. However, if the entrance button 13NB is operated to a rotated position for clearing a low speed signal, negative potential (B—) is applied to the initiating circuits described above and energy would pass through the rectifier unit 50 conditioning the exit relay 10XR. The exit relay 11XR would also be conditioned by this negative energy. In other words, the route from signal 13 to signal 10 is a low speed route while the route from signal 13 to signal 11 is for both high and low speed traffic.

*Exit operation*

Assuming that the operator has rotated the entrance button 13NB, then a route can be established either to signal 10 or to signal 11 by merely actuating the corresponding exit button XB. If he actuates the exit button 10XB, energy passes through the rectifier unit 50 to the right-hand terminal of the exit relay 10XR, winding of relay 10XR, back contact 53 of relay 10NR, actuated contact 54 of relay 10XB, to (CN). As soon as the exit relay 10XR picks up, it closes its front contact 55 to complete a stick circuit by connecting the mid-tap (CN) to the left-hand terminal of relay 10XR.

On the other hand, if the operator actuates the exit button 11XB, energy passes from the heel of contact 46, through front contact 47 of track relay 3TR, windings of exit relay 11XR, back contact 70 of relay 11NR, back contact 71 of relay 11CNR, actuated contact 72 of exit button 11XB, to (CN). As soon as the relay 11XR picks up, it closes front contact 73 to connect (CN) to its left-hand terminal so that the relay 11XR is maintained energized independently of the release of the exit button 11XB.

It is of course understood that only one of the routes can be established at any one time, so that the operator will actuate either the button 10XB or the button 11XB depending upon the particular route desired. The operation of the exit buttons for both routes has been pointed out for the purpose of making it more clear that conditioning energy is supplied to the exit relay XR for the exit end of each available route originating at the designated entrance point.

*Completion operation*

The response of an exit relay XR to the actuation of its corresponding button occurs only if a route terminating at the corresponding exit point is available for use, so that the response of such exit relay XR can immediately apply energy to the completion circuits for picking up the primary switch control relays for the switches in the corresponding route.

Assuming that the operator has actuated the buttons 13NB and 10XB, and that the relay 10XR is picked up, a circuit is then closed for picking up the relay 3R from (+), through a circuit including front contact 56 of relay 10XR, wire 57, back contact 59 of relay 3N, winding of relay 3R, to (—).

The response of the relay 3R passes energy on from its left-hand terminal through its front contact 60, front contact 61 of relay 4AY, upper winding of relay 4AN, to (—).

The response of the relay 4AN passes energy on from its left-hand terminal, through its front contact 62, front contact 63 of relay 4AY, wire 64, (Figs. 1B, 1C, 1D), winding of relay 13XP, back contact 65 of relay 13XR, to (—). The relay 13XP is employed in connection with the control of through routes and its operation is not pertinent to the establishment of this particular route between signal 13 and signal 10.

On the other hand, if the operator has actuated the buttons 13NB and 11XB, the response of the exit relay 11XR applies energy to the completion circuit for picking up the relay 2AN from (+), through a circuit including front contact 74 of relay 11XR, front contact 75 of relay 2AY, windings of relay 2AN, to (—).

The response of the relay 2AN passes energy on from its left-hand terminal through its front contact 76, front contact 77 of relay 2AY, wire 78, back contact 79 of relay 3Y, windings of relay 3N, to (—).

The response of the relay 3N passes energy on from its left-hand terminal through its front contact 80, back contact 81 of relay 3Y, front contact 61 of relay 4AY, windings of relay 4AN, to (—). The response of relay 4AN passes energy on to the relay 13XP as above pointed out.

It will thus be seen that the operation of an entrance button causes the initiating circuits to perform a preselection operation and to condition the exit relays for the exit ends of the various available routes originating at such designated entrance point. The response of an exit relay to the actuation of an exit button then effects a completion operation to energize the primary switch control relays for the switches in a particular one of such available routes to be operated in accordance with such preselection, and these primary switch control relays then cause the establishment of the desired route.

The response of the primary switch control relays to the energization of the completion circuit network is also effective to complete the interlocking operation between routes which conflict with the route then being established. More specifically, the response of the relay 4AN opens back contacts 82 and 66 in the initiating circuits so that no energy can be supplied over the initiating circuit portions corresponding to the crossover 4 reversed. Also, back contact 83 of relay 4AN opens the completion circuits for relay 4R insofar as the supply of energy to such relay can be effected from exit points at the left-hand end of this interlocked group.

If the route is established from signal 13 to signal 10, then the picking up of the relay 3R opens back contact 43 which deenergizes the relay 2AY and removes potential from the exit relay 11XR.

On the other hand, if the route is established from signal 13 to signal 11 the picking up of the relay 3N opens back contact 48 removing potential from the exit relay 10XR.

In other words, the preselection operation which has been performed for all the routes originating at the signal location corresponding to the actuated entrance button, is cancelled for all of such routes except the one selected by the actuation of its exit button. This provides that any switches not included in the selected route may be employed in any possible routes that are not in conflict with the selected route.

It is of course obvious that the picking up of the primary switch control relays 2AN, 3N and 4AN for establishing the route from signal 13 to a signal 11, for example, opens their respective contacts in the initiating circuits in a manner to completely interlock that route against the establishment of any conflicting route.

*Typical switch control (Fig. 2)*

The picking up of any primary switch control relay, such as relay 2AN, for example, causes the operation of the associated switch machine, or switch machines, as the case may be. The pick-up circuits for the primary switch control relays have been shown in Figs. 1A-1E, but the control circuits governed by such relays and their stick circuits have been typically shown in Fig. 2 with respect to the control relays 2AN—2R—2BN for the crossover 2.

With the track switches of the crossover 2 in normal positions, the relay 2WP is energized with a normal polarity so that its contacts assume normal positions. While the primary switch control relays 2AN—2R—2BN are deenergized, the correspondence relays 2NCR and 2RCR are also deenergized, but the picking up of a primary switch control relay, such as 2AN, with the track switches already in normal positions, immediately causes the energization of the normal correspondence relay 2NCR, and the secondary switch control relay 2WZ remains deenergized as no switch operation is required under such circumstances. The same is true with regard to relay 2BN. Similarly, if the track switches are standing in reverse positions and the relay 2R is picked up, the relay 2RCR is immediately energized and the relay 2WZ remains deenergized as no switch operation is required under such circumstances.

But whenever a switch operation is required in response to the energization of a primary switch control relay, the secondary switch control relay 2WZ is energized and maintained energized until the switch or switches have operated into correspondence with their primary switch control relays after which the switch control relay 2WZ is deenergized allowing the proper correspondence relay to be picked up. With this sequence of operations, it is then possible to select the signal control circuits through contacts of the correspondence relays 2NCR and 2RCR with the assurance that the track switches are in the proper positions and operating energy has been removed therefrom before a signal can be cleared.

It is noted that the lock relay 3L is normally energized by a circuit closed from (+), and including front contact 84 of relay 3ES, front contact 85 of relay 3TR, front contact 86 of relay 3WS, windings of 3L, to (—). Similarly, the lock relay 9L is normally energized by a circuit closed from (+), and including front contact 87 of relay 9ES, front contact 88 of relay 9TR, front contact 89 of relay 9WS, windings of relay 9L, to (—). It is noted that these same circuits have also been shown in Fig. 5 of the accompanying drawings together with the other lock relays 4L and 10L, and have been repeated in this Fig. 2 for convenience in the consideration of the switch control circuits. It is of course understood that the directional stick relays ES and WS are controlled as shown in Fig. 4 so as to be dropped away only after the route has been established and the signal control relay picked up.

Assuming that the track switches of crossover 2 are in normal positions and the relay 2AN is picked up, the normal correspondence relay 2NCR is energized by a circuit closed from (+), including front contact 90 of relay 2AN, polar contact 91 of relay 2WP in a right-hand position, front contact 92 of relay 2WP, back contact 93 of relay 2WZ, windings of relay 2NCR, to (—). If the relay 2BN is picked up instead of the relay 2AN, then front contact 94 is closed to supply energy (+) to the circuit just pointed out through back contact 90.

Let us assume that the primary switch control relay 2R is picked up (although the manner of its energization has not been specifically described as yet in connection with Figs. 1A to 1E) to establish some route over the crossover 2, then energy is applied to the relay 2WZ for actuating its contacts to reverse controlling positions through a circuit from (+), including back contact 90 of relay 2AN, back contact 94 of relay 2BN, front contact 95 of relay 2R, polar contact 96 of relay 2WP in a right-hand position, front contact 97 of relay 9L, front contact 98 of relay 3L, lower winding of relay 2WZ, to (—). The picking up of the neutral contacts 99 and 100 together with the actuation of the polar contacts 101 and 102 to left-hand reverse controlling positions, applies a proper polarity to the switch machines 2ASM and 2BSM to cause their reverse operation in the well known manner. When the track switches are unlocked, the relay 2WP is of course deenergized so that the polar contact 96 is shunted by back contact 103. Upon the completion of the operation of the track switches of crossover 2 to reverse positions, the relay 2WP is supplied with the opposite polarity actuating its polar contacts to left-hand positions and picking up its neutral contacts. However, the polar contact 96 is shunted by back contact 103 so that the relay 2WZ is maintained energized until the relay 2WP is fully energized to pick up its neutral contacts. When this has been effected the relay 2WZ is deenergized and a circuit is then closed for the reverse correspondence relay 2RCR from (+), and including back contact 90 of relay 2AN, back contact 94 of relay 2BN, front contact 95 of relay 2R, polar contact 96 of relay 2WP in a left-hand position, front contact 104 of relay 2WP, back contact 105 of relay 2WZ, windings of relay 2RCR, to (—).

Let us assume that the track switches of crossover 2 are in reverse positions and that the relay 2AN is energized to operate them to normal positions, then the relay 2WZ is energized over a circuit from (+), and including a front contact 90 of relay 2AN, polar contact 91 of relay 2WP in a left-hand position, front contact 106 of relay 9L, front contact 107 of relay 3L, upper winding of relay 2WZ, to (—). During the operation of the track switches the relay 2WP is deenergized closing back contact 108 to shunt the polar contact 91. The track switches of crossover 2 are of course operated to normal positions while the relay contacts 99 and 100 of relay 2WZ are picked up and its polar contacts 101 and 102 are in right-hand normal controlling positions. At the end of the operation of the switches to normal positions, the relay 2WZ is deenergized closing back contact 93 to allow the energization of the correspondence relay 2NCR over its circuits previously pointed out.

If for some reason the primary switch control relays 2AN—2R—2BN are deenergized during a switch controlling operation insofar as the entrance-exit route establishing control is concerned, the secondary switch control relay 2WZ is maintained energized irrespective of the primary switch control relays to complete the switch operation already initiated. This is effected by local energizing circuits. Assume that the track switches of crossover 2 are being operated to reverse positions, then the relay 2WP is deenergized but its polar contacts are in the normal positions shown and the relay 2WZ has been energized so that its polar contacts are in left-hand reverse controlling positions and its neutral contacts are picked up. If the relay 2R is deenergized before the operating stroke is completed, then the relay 2WZ is energized by a circuit closed from (+), and including front contact 109 of relay 2WZ, polar contact 110 in a left-hand position, back contact 103 of relay 2WP in multiple with polar contact 96 in a right-hand position, front contact 97 of relay 9L, front contact 98 of relay 3L, lower winding of relay 2WZ, to (—). When the switch machines 2ASM and 2BSM have operated the switches of crossover 2 to reverse positions, the relay 2WP is of course energized with the proper polarity to actuate its contacts to left-hand positions picking up the neutral contact 103 which deenergizes the relay 2WZ. The correspondence relay 2RCR is not energized because the primary switch control relays are deenergized.

On the other hand, if the track switches of crossover 2 are in reverse positions and are being operated to normal positions by relays 2AN and/or 2BN, then a similar circuit for maintaining relay 2WZ energized in a normal controlling position is closed from (+), including front contact 109 of relay 2WZ, polar contact 110 of relay 2WZ in a right-hand position, back contact 108 of relay 2WP in multiple with polar contact 91 in a left-hand position, front contact 106 of relay 9L, front contact 107 of relay 3L, upper winding of relay 2WZ, to (—). The completion of the operation of the track switches to normal positions of course energizes the relay 2WP with the proper polarity to actuate its polar contacts to right-hand positions and pick up its neutral contacts including contact 108 to deenergize the relay 2WZ. The correspondence relay 2NCR remains deenergized as the primary switch control relays are all deenergized.

The switch control circuit is so organized that even though the primary switch control relays are deenergized and the secondary switch control relay is also deenergized, the accidental movement of the track switches away from their normal or reverse positions automatically causes the restoration of such switches to the positions to which they were last controlled. The same automatic operation occurs if the track switches are hand cranked out of their last controlled position and their control circuits again closed. It is understood that the insertion of the hand crank of course opens the local operating circuit of the switch machine motor so that the switch may be cranked to an opposite position, and power is not applied to the switch machine motor until the crank is removed.

When a switch is hand cranked out of a normal or a reverse position, or is accidentally moved out of such positions, its associated relay WP is of course deenergized which effects the closure of an energizing circuit for the secondary switch control relay WZ to actuate such relay to the last controlled position as determined by the position of the polar contacts of the associated WZ relay. This can be done as the polar contacts are of the magnetic stick type and remain in their last actuated position. When the relay WZ is thus energized (assuming the crank to be removed), power is applied to the motor and the track switch or switches involved are restored to their last controlled position.

More specifically, assume that one or the other or both of the track switches associated with the crossover 2 are hand cranked or accidentally moved out of their normal positions deenergizing the relay 2WP, then a circuit is closed for energizing the relay 2WZ to a normal controlling position from (+), including back contact 90 of relay 2AN, back contact 94 of relay 2BN, back contact 95 of relay 2R, back contact 111 of relay 2WP, polar contact 110 of relay 2WZ in a right-hand position, neutral contact 108 of relay 2WP, front contact 106 of relay 9L, front contact 107 of relay 3L, upper winding of relay 2WZ, to (—). If the switches are accidentally jarred out of locked normal positions then the normal control immediately becomes effective to restore them to such positions at which time the relay 2WP is reenergized and opens back contact 111 deenergizing the relay 2WZ.

It is obvious that a similar operation would occur if the track switches were standing in reverse positions, by reason of the back contact 111 of relay 2WP applying (+) energy to the polar contact 110 so that with it in a left-hand reverse controlling position, the relay 2WZ is energized over its reverse energizing circuit.

The switch control circuits of the present invention are also organized so as to provide that the primary switch control relays may be energized by auxiliary switch control levers individual to their respective track switches and crossovers. This auxiliary control is interlocked with the entrance-exit route establishing control in such a way that the control first effected cannot be interrupted by the other.

More specifically, the relay 2AN can be energized by the actuation of the control lever 2SML to a normal controlling position from its neutral non-controlling position by reason of a circuit closed from (+), including lever contact 112 in a normal position, back contact 113 of relay 2R, lower winding of relay 2AN, to (—). At the same time the relay 2BN is energized by a circuit closed from (+), including lever contact 114 in a normal position, back contact 115 of relay 2R, lower winding of relay 2BN, to (—).

On the other hand when the lever 2SML is operated to its reverse position, the relay 2R is energized by a circuit closed from (+), including lever contact 112 in a reverse position, back contact 116 of relay 2AN, back contact 117 of relay 2BN, lower winding of relay 2R, to (—).

The energization of the primary switch control relays by reason of the operation of the auxiliary lever 2SML, effects the control of the track switch through the secondary switch control relay 2WZ in the same manner and over the same circuits above pointed out.

It may happen, when the primary switch control relays are being controlled either by the auxiliary lever 2SML or by their entrance-exit controlled completion circuits, that it becomes necessary to reverse the operation of the switches in mid-stroke. It is obvious by consideration of the pick-up circuits controlled by the lever 2SML that the reverse relay 2R must be deenergized before the relays 2AN and 2BN can be picked up; and also the relays 2AN and 2BN must be deenergized before the relay 2R can be picked up. A similar interlock is provided in the entrance-exit controlled completion circuits. In other words, the reversal of control may be effected providing the conflicting position does not have its primary switch control relay energized.

A change in the control present in the primary switch control relays is transferred to the secondary switch control relay 2WZ provided the associated lock relays 3L and 9L are energized. This reversal of control upon the secondary switch control relay 2WZ is effected by neutralization of the control previously set up.

For example, if the secondary switch control relay 2WZ has been energized through its upper winding to cause the operation of the track switches to normal positions, then the relay 2WZ remains energized by reason of the stroke completing stick circuit including front contact 109 even though the primary switch control relay 2AN or 2BN is deenergized before the stroke is completed. If the reverse primary switch control relay 2R is then picked up, energy is placed on the lower winding of the secondary switch control relay 2WZ which causes a flux to be produced in the relay in a direction opposing the flux produced by the energization of the upper winding of the relay. In other words, both windings of the relay are energized, one through the stick circuit used to effect completion, and the other through the regular reverse control circuit. These opposing fluxes in the relay neutralize each other and cause the neutral contacts of the relay 2WZ to drop away. The opening of contact 109 deenergizes the stroke completing stick circuit for continuing the normal operation, and before the neutral contacts can again pick up the polar contacts assume positions in accordance with the energization effected through the reverse control circuit. When the neutral contacts then pick up front contact 109 merely applies (+) to the stick circuit provided for the completion of the reverse operation of the switches. This drop away of the neutral contacts upon the neutralizing effect produced by the energization of both of the windings of the relay, followed by the response of the polar contacts to the energization of one winding alone before the neutral contacts can again pick up, is a characteristic of the usual polar neutral type relay employed for such secondary switch control relays.

Whenever a route is established over the track switches of a crossover (or over a single switch) such track switches are locked against operation by reason of the deenergization of the associated lock relay L, which lock relay L not only opens contacts to prevent further energization of the secondary switch control relay WZ, but also closes stick circuits for the primary switch control relays in such a manner as to maintain an interlock between any conflicting routes including such track switches. In other words, the establishment of a route initially causes an interlock between that route and any conflicting routes and the presence of a train in such established route maintains that interlock although the control buttons have been manually restored or automatic restoration of the entrance relays has been effective.

For example, if a route is established between signal 13 and signal 11, the lock relay 3L is deenergized (as will be explained later) so that a stick circuit for the relay 2AN is closed from (+), including back contact 118 of relay 3L, front contact 119 of relay 2AN, front contact 116 of relay 2AN, lower winding of relay 2AN, to (—). This stick circuit is closed irrespective of whether the relay 2AN has been initially picked up by the entrance-exit route establishing control or by the operation of the auxiliary control lever 2SML to a normal controlling position.

The primary switch control relay 2BN has a stick circuit controlled by the lock relay 9L by reason of a circuit from (+), including back contact 146 of relay 9L, front contact 147 of relay 2BN, front contact 117 of relay 2BN, lower winding of relay 2BN, to (—). This stick circuit is closed whenever a route is established over the crossover 2 in a normal position.

Whenever the crossover 2 is reversed and a route is established thereover, stick circuits are closed for the relay 2R whenever either or both of the lock relays 3L and 9L are deenergized. When the lock relay 9L is deenergized, a circuit is closed for relay 2R from (+), including back contact 146 of relay 9L, front contact 149 of relay 2R, front contact 115 of relay 2R, lower winding of relay 2R, to (—).

Another stick circuit for the relay 2R is closed while the lock relay 3L is deenergized from (+), including back contact 118 of relay 3L, front contact 148 of relay 2R, front contact 115 of relay 2R, lower winding of relay 2R, to (—).

These stick circuits for the primary switch control relays which are closed upon the dropping of their associated lock relays, not only maintain the interlock between conflicting routes, but are also associated with the movement of the auxiliary switch control lever SML to a new controlling position while a route is established, so that such new control will not effect the control of the associated switch or switches to a new position upon the release of the locking of those switches. This is ordinarily termed the prevention of preconditioning and is sometimes called the "electric lock equivalent."

For example, when a route established from signal 13 to signal 11 with the relay 2AN picked up, the stick circuit just pointed out is closed for relay 2AN with the lock relay 3L deenergized. This relay 2AN is thus maintained energized irrespective of the entrance-exit route establishing control. If the operator should for some reason move the lever 2SML to the reverse controlling position, this new control cannot be consummated either at that time or when the lock relay 3L is picked up by reason of the fact that a stick circuit is closed from (+), through lever contact 112 in a reverse controlling position, front contact 116 of relay 2AN, lower winding of relay 2AN, to (—). This requires that the lever 2SML must be restored to its neutral noncontrolling position before a new control can be effected for the track switches.

Similar stick circuits to prevent preconditioning are provided for each of the primary switch control relays, as will be obvious from a consideration of the circuits shown in Fig. 2, and due to such similarity they will not be pointed out in detail.

It is believed that the above description of the typical switch control shown in Fig. 2 may be readily applied to the control of any of the track switches or crossovers shown in the track layout selected for the embodiment of the present invention or to the track switches of any track layout found in practice.

*Signal control circuits (Fig. 3)*

After the track switches of a route have operated to proper positions for that route in response to the control of the route establishing means, the signal control relay for the signal location at the end of that route designated as the entrance point is then energized. As, for example, the route from signal 13 to signal 11 has the relays 13NR and 11XR picked up if the operator has designated that route to be governed by the high speed signal 13A; but if the operator has designated such route to be governed by the low speed or call-on signal 13B, then the entrance relay 13CNR is picked up instead of the entrance relay 13NR. Thus, upon the response of the track switches included in that route from signal 13 to signal 11 either the high speed signal 13A is cleared or the signal 13B depending upon the operator's distinctive manipulation of the entrance button 13NB.

Assuming that the operator designated such route to be governed by the signal 13A, then an energizing circuit is closed for the signal control relay 13AG from (+), including front contact 120 of relay 11XR, front contact 121 of relay 3TR, front contact 122 of relay 2NCR, back contact 123 of relay 2RCR, front contact 124 of relay 3NCR, back contact 125 of relay 3RCR, front contact 126 of relay 4TR, front contact 127 of relay 4NCR, back contact 128 of relay 4RCR, back contact 129 of relay 13XR, front contact 130 of relay 13NR, winding of relay 13AG, to (—).

The picking up of contacts 131 and 132 of relay 13AG applies energy to the signal mechanism of signal 13A in a manner described in connection with Fig. 6, and such energy has a polarity determined by contacts 133 and 134 of relay 20GYP. With the signal 20 at stop, the relay 20GYP is deenergized so that the signal 13A is supplied with the proper polarity to cause it to indicate yellow or caution; while if the signal 20 is clear then the polarity applied to the mechanism of signal 13A is such as to cause it to indicate green or clear. The relay 20GYP is controlled by the signal 20 in a manner typically shown in Fig. 6 for relay GYP.

It is of course to be understood that the operator can return the signal 13A to stop at any time by merely pulling the button 13NB to deenergize the entrance relay 13NR. Also, the passage of a train past the signal 13 causes the track relay 4TR to be deenergized opening front contact 29 (see Fig. 1B), which deenergizes the stick circuit for the entrance relay 13NR automatically restoring the signal 13A to stop.

On the other hand, if the operator had rotated the entrance button 13NB to energize the entrance relay 13CNR to clear the call-on signal, then the signal 13B would be cleared by the energization of the signal relay 13BG.

More specifically, the relay 13BG has an energizing circuit under such circumstances from (+), through a circuit including front contact 135 of relay 11XR, front contact 136 of relay 2NCR, back contact 137 of relay 2RCR, front contact 138 of relay 3NCR, back contact 139 of relay 3RCR, front contact 140 of relay 4NCR, back contact 141 of relay 4RCR, back contact 142 of relay 13XR, front contact 143 of relay 13CNR, windings of relay 13BG, to (—). The picking up of contacts 144 and 145 of this relay 13BG applies energy to the signal mechanism 13B to cause it to indicate proceed at low speed.

This signal 13B can be manually restored to stop by the rotation of the entrance button 13NB to its normal non-operated position. This effects the deenergization of the relay 13CNR in turn deenergizing the route establishing means and the signal control relay 13BG in an obvious manner.

The effect of the presence of a train in an established route upon the clearing of signals for that route will be discussed in detail hereinafter.

Route locking (Figs. 4 and 5)

The embodiment of the present invention includes sectional release route locking as well as approach locking in Figs. 4 and 5 of the accompanying drawings. Each track section has associated therewith a lock relay L, an east directional stick relay ES and a west directional stick relay WS. Each signal location has associated therewith an approach locking stick relay AS together with a thermal time release relay TH.

Each of the locking relays L is energized through a circuit dependent upon the directional stick relays ES and WS for the associated track section (see Fig. 5). The circuits for lock relays 3L and 9L have been pointed out in connection with Fig. 2. The lock relay 4L has a circuit from (+), including front contact 150 of relay 4ES, front contact 151 of relay 4TR, front contact 152 of relay 4WS, winding of relay 4L, to (—). The lock relay 10L has an energizing circuit closed from (+), including front contact 153 of relay 10ES, front contact 154 of relay 10TR, front contact 155 of relay 10WS, windings of relay 10L, to (—).

The directional stick relays ES and WS have been shown in detail in Fig. 4 as well as the approach stick relays AS. Similar control circuits have been shown in general in the prior patent of C. F. Stoltz, Patent No. 2,115,511, dated April 26, 1938. However, for the purpose of clarity in the present disclosure, the circuits for the directional stick relays involved in the routes between signals 11 and 13 will be pointed out in detail.

The directional stick relay 3ES associated with the track section 3T has an energizing circuit closed from (+), and including back contact 156 of the thermal relay 11TH, back contact 157 of relay 11BG, back contact 158 of relay 11AG, front contact 159 of relay 11AS, front contact 160 of relay 3TR, windings of relay 3ES, to (—). Front contact 161 of relay 3ES is provided to shunt the front contact 160 of its associated track relay 3TR.

The directional stick relay 4ES is provided with an energizing circuit from (+), and including back contact 162 of thermal relay 10TH, back contact 163 of signal relay 10G, front contact 164 of relay 10AS, front contact 165 of relay 3ES, front contact 166 of track relay 4TR, windings of relay 4ES, to (—). Front contact 167 of relay 4ES is provided to shunt the front contact 166 of relay 4TR.

The directional stick relay 4WS has an energizing circuit closed from (+), and including back contact 168 of thermal relay 13TH, back contact 169 of signal relay 13BG, back contact 170 of relay 13AG, front contact 171 of relay 13AS, front contact 172 of relay 10WS, front contact 173 of track relay 4TR, windings of relay 4WS, to (—). Front contact 174 of relay 4WS is provided to shunt the contact 173 of track relay 4TR.

The directional stick relay 3WS is provided with an energizing circuit closed from (+), and including front contact 175 of relay 4WS, front contact 176 of relay 9WS, front contact 177 of relay 3TR, windings of relay 3WS, to (—). The front contact 178 of relay 3WS is provided to shunt the contact 177 of relay 3TR.

It is noted that front contact 179 of relay 4NCR is provided to shunt the contact 172 of the directional stick relay 10WS while the crossover 4 is in a normal controlled position, and similarly the front contact 180 of relay 2NCR is provided to shunt the front contact 176 of relay 9WS, while the crossover 2 is in a normal controlled position. These contacts of relays 4NCR and 2NCR prevent the establishment of routes on the track including track sections 9T and 10T from effecting the route locking associated with track sections 3T and 4T, while the crossovers 2 and 4 are in normal controlled positions. In other words, the correspondence relays NCR and RCR are normally deenergized but assume their positions when a route is established by the switches and prior to the clearing of a signal resulting in the release of the route locking.

The approach stick relay 11AS is energized by a circuit from (+), and including front contact 181 of signal repeating relay 11RGP, front contact 182 of track relay 2TR for the track section 2T in approach to the signal 11, windings of relay 11AS, to (—). Under normal conditions a stick circuit is provided for relay 11AS from (+), and including front contact 131 of relay 11RGP, winding of thermal relay 11TH, front contact 183 of relay 11AS, windings of relay 11AS, to (—). The energy which flows in this stick circuit maintains the relay 11AS energized although it is insufficient to actuate the thermal relay 11TH. This stick circuit maintains the relay 11AS energized when a train approaches the signal 11 and deenergizes the track relay 2TR opening front contact 182, unless the signal 11 is cleared dropping the signal repeating relay 11RGP (typical circuit for RGP relay shown in Fig. 6).

In a similar manner, the approach stick relay 13AS is energized by a circuit from (+), and including front contact 184 of relay 13RGP, front contact 185 of track relay 5TR, windings of relay 13AS, to (—). A stick circuit is provided for the relay 13AS from (+), including front contact 184 of relay 13RGP, windings of thermal relay 13TH, front contact 186 of relay 13AS, windings of relay 13AS, to (—).

The sequence of the operations occurring upon the establishment of a route and the locking thereof may now be briefly summarized. The actuation of an entrance button and the response of the entrance relay causes the preselecting relays to be conditioned for the various routes originating at the designated entrance point, while the actuation of the exit button for a particular one of the routes and the response of the exit relay causes the primary switch control relays for that particular route to be energized over the completion circuits.

When the track switches have operated into correspondence with their respective primary switch control relays, the correspondence relays for the particular route are picked up and select the proper signal control circuits and route locking circuits. The signal control relay then responds and causes the route locking to become effective, and at the same time the signal is controlled to indicate clear in accordance with traffic conditions and the manual operations performed. The actuation of the signal mechanism to a clear position deenergizes the RGP relay for that signal which further checks and maintains the route locking deenergized. For example, when a route is established between the signals 13 and 11, the clearing of the signal 13A is effected by the picking up of the relay 13AG. The opening of back contact 170 of relay 13AG (see Fig. 4) causes the route locking to become effective by deenergizing the relays 4WS and 3WS in succession. When the signal clears and the relay 13RGP is deenergized, the opening of front contact 184 also deenergizes the approach stick relay 13AS, which opens front contact 171 to further check and maintain the directional stick relays 4WS and 3WS deenergized.

It might be well to note at this time that although the route locking is not rendered effective until the signal control relay 13BG is energized, the system assures that the track switches cannot further operate under such circumstances because the correspondence relays 2NCR, 3NCR and 4NCR in this particular case cannot be energized unless the associated secondary switch control relays 2WZ, 3WZ and 4WZ are deenergized. In other words, power must be removed from the associated switch machines before the signal control relay 13AG can be energized, and the dropping of the route locking relays is provided to assure that such route is maintained locked so long as the signal is cleared and for a predetermined time thereafter if a train is approaching such signal.

The dropping of the relays 4WS and 3WS respectively cause the deenergization of the lock relays 3L and 4L of Fig. 5 which in turn lock the track switches 2, 3 and 4 as typically described in connection with Fig. 2.

It is noted that the clearing of the route from signal 13 deenergizes the west directional stick relays 4WS and 3WS but the east directional stick relays 3ES and 4ES are maintained energized because signal 11 remains at stop, and also because their front contacts 161 and 167 respectively shunt out the track contacts 168 and 166, so that even though a train passes over the corresponding track sections these east directional stick relays 3ES and 4ES are not deenergized.

Assuming that a train is in approach to the signal 13 on the track section 5T, the operator cannot change the route in advance of the signal 13 until a predetermined time after he has restored such signal to stop. This is because the front contact 185 of track relay 5TR is open, so that even though the signal 13 is returned to stop and contact 184 of relay 13RGP is closed, the relay 13AS can not be energized. However, energy is applied to the winding of the thermal relay 13TH from (+), including front contact 184 of relay 13RGP, winding of thermal relay 13TH, back contact 186 of relay 13AS, to (—). The energy which flows in this circuit causes the front contact 187 of the thermal relay 13TH to be closed after a time to apply energy to the right-hand terminal of the relay 13AS which immediately picks up. The picking up of the relay 13AS opens the energizing circuit for the winding of the thermal relay 13TH and includes such winding in series with the relay 13AS in its stick circuit, but as the energy flow is substantially reduced, the thermal relay 13TH begins to cool. Thus, after a time measured by the over and back operation of the thermal relay 13TH, the back contact 168 of such thermal relay is closed so as to release the route locking including the relays 4WS and 3WS. In other words, the route locking is provided with what is commonly known as a time release means.

If the signal is maintained clear and the train passes over the route, the deenergization of the track relay 4TR of course causes the opening of front contact 126 and the return of the signal 13 to stop, so that the closure of back contact 288 of track relay 4TR restores the approach stick relay 13AS to an energized condition without requiring the predetermined time of the thermal timer. It may also be noted that the signal 13A is a stick signal by reason of the fact that the opening of front contact 29 of track relay 4TR (see Fig. 1D) deenergizes the stick circuit of the entrance relay 13NR and restores the signal to stop.

Although Figs. 4 and 5 show the route locking for only the interlocked group including track switches 2, 3 and 4, it is to be understood that such route locking may be applied to the other interlocked group including crossovers 5 and 6, and to any other track layout found in practice.

*Manual restoration of route to stop*

Assuming that the route from signal 13 to signal 11 has been established and the signal 13 cleared therefor, the signal 13A may be manually returned to stop at any time. This is effected by the operator merely pulling the button 13NB (Fig. 1D) to open the normally closed contact 30 of this button included in the stick circuit for the entrance relay 13NR. The dropping of the relay 13NR opens its front contact 130 (see Fig. 3) which immediately deenergizes the signal relay 13AG to in turn deenergize the signal mechanism and cause the signal 13A to give a stop indication.

Assuming that there is no train approaching the signal 13A, the dropping of the entrance relay 13NR opens front contact 35 which deenergizes the initiating circuit and drops the exit relay 11XR. The opening of front contact 74 of relay 11XR deenergizes the primary switch control relays 2AN, 3N and 4AN which immediately drop away as soon as their stick circuits are opened by the picking up of their associated lock relays L (see Fig. 2 for typical switch control). It is of course understood that the picking up of the lock relays is effected only after the directional stick relays for the corresponding direction have been picked up, which is initiated as soon as the signal mechanism for the signal 13A assumes a stop position and its red repeating relay 13RGP is picked up.

On the other hand, if a train is approaching signal 13A, then the signal may be manually restored to stop as above described, but the approach stick relay 13AS is not energized until after a predetermined time as described in connection with the route locking. Thus, the lock relays for the switches are maintained deenergized until after this predetermined time has elapsed. During this time interval the preselecting relays 4AY and 2AY are deenergized as well as the exit relay 11XR, but the relays 2AN, 3N and 4AN are maintained energized through their stick circuits typically shown in Fig. 2, so that a route conflicting with such route cannot be established nor can its manual control be stored because the contacts on the primary switch control relays included in the initiating circuits prevent the flow of conditioning energy for such a conflicting route. For example, energy cannot flow to the exit relay 10XR while the primary switch control relay 3N is picked up because the back contact 48 is open. Thus, the operator may return the governing signal of any route to stop at any time he so desires, but the restoration of the route establishing means with regard to that route is dependent upon traffic conditions.

*Automatic restoration and passage of a train*

It has been briefly pointed out above that the passage of a train past the signal 13A causes the signal to be automatically restored to stop. This operation which is effected by the opening of the stick circuit of the entrance relay 13NR upon a train deenergizing the track relay 4TR opening front contact 29 (see Fig. 1D), causes the preselecting and conditioning circuits to be deenergized dropping the exit relay 11XR. This deenergizes the pick-up circuits for the primary switch control relays 2AN, 3N and 4AN, but these relays are maintained energized through their stick circuits by reason of the dropped away condition of their respective lock relays L (typically shown in Fig. 2). The passage of the train onto the track section 4T causes the approach locking stick relay 13AS to be picked up as above described, but the open condition of front contact 173 of track relay 4TR prevents the relay 4WS from picking up which in turn maintains the relay 3WS deenergized (see Fig. 4). In other words, the route is maintained locked in advance of the train although the signal is restored to stop and its associated approach locking apparatus is automatically released. During this time, the picked up condition of the relays 2AN, 3N and 4AN prevents the manual conditioning of a conflicting route as well as preventing individual control of any track switches included in the occupied route.

As the train passes through the route onto the track section 3T, for example, after wholly leaving the track section 4T, the relay 4WS is picked up and the lock relay 4L is energized so that the track switches 3 and 4 may be used in some other route. This is called rear release locking as above mentioned.

While a train is in a route, it may be desirable to couple another train thereto and perform certain switching operations. The present invention provides that such switching operations may be effected by the use of low speed or call-on signals, but while a train is in such a route the clearing of a high speed signal such as 13A cannot be effected. For example, if the operator actuates the button 13NB while the train is standing on track section 3T, the entrance relay 13NR would be picked up as above described, but the application of positive potential (B+) through front contact 35 cannot flow to the exit relay 11XR because of the blocking effect of the rectifier unit 188, which rectifier unit is not shunted by front contact 47 of relay 3TR while a train is on this track section (see Fig. 1A).

On the other hand, if the operator rotates the entrance button 13NB to close the circuit for energizing the call-on entrance relay 13CNR, negative potential (B—) is applied through front contact 36 which energizes relays 4AY and 2AY as above pointed out and which passes energy through the rectifier unit 188 so that the actuation of the exit button 11XB causes the picking up of the relay 11XR even though front contact 47 of 3TR is open. The closure of front contact 74 effects the energization of any switch control relays such as 3N and 4AN not then energized and the route is established in the same manner as above described. In this case, however, the picking up of the relay 13CNR closes the energizing circuit at front contact 143 for the relay 13BG which in turn causes the signal 13B to clear.

Inasmuch as the entrance button 13NB remains in an operated position when rotated to clear a low speed signal, such a signal can be returned to stop only by manual restoration of the button to its normal position. It is to be understood, however, that the clearing of a low speed signal sets the route locking and approach locking into operation the same as above described for a high speed signal.

Through Route Operation

When an operator desires to establish some through route, he momentarily pushes the entrance button NB for the entering signal location which causes the entrance relay NR for that location to be picked up in the same way as if a high speed route were to be merely established in the same interlocked group. This energization of the entrance relay applies positive energy from (B+) to the initiating circuits for each of the routes and through routes originating at that signal location. This energy causes the preselection of the trailed switches in such routes and through routes by the selective energization of the associated AY and/or BY relays for those switches. In other words, this picking up of an entrance relay NR causes the preselection operation to be performed for the routes originating at that entrance point followed by the picking up of an entrance repeating relay NP for the end of each of those routes. These entrance repeating relays NP in turn apply energy to the circuits for the routes originating at the corresponding locations, so that the initiating circuits for the routes in the various interlocked groups forming a part of the through routes originating at the designated entrance point have energy applied thereto.

The operator may then actuate the exit button for the extreme exit signal location of any one of the through routes or he may actuate the exit button for any intermediate signal location and the through route will be established from the designated entrance point to the designated exit point without any further manipulation on the part of the operator.

The system operates automatically at the intermediate signal locations for any through route to energize the entrance and exit relays for such locations so that when the through route is established the signals at the entrance to each interlocked group are cleared dependent upon the continued energization of their respective entrance relays and these entrance relays are each dependent upon their respective entrance buttons. In other words, in order to restore to stop the entering signal and the intermediate signals for a through route, the operator must actuate the entrance button for each of such signals.

We will now consider in detail the manner in which the system of the present invention responds to the actuation of entrance and exit buttons NB and XB to effect the establishment of a through route between the corresponding signal locations.

Entrance operation

With the system in the normal condition illustrated in the drawings, the operation of the entrance button 11NB, for example, causes the associated entrance relay 11NR to be energized by a circuit closed from (+), and including front contact 189 of track relay 3TR, depressed contact 190 of button 11NB, back contact 191 of relay 11CNR, windings of relay 11NR, to (—). When the relay 11NR is picked up, it closes front contact 192 so that the release of the button 11NB causes the relay 11NR to be dependent upon a stick circuit, as described in connection with the relay 13NR.

Preselecting and conditioning operation

The picking up of the entrance relay 11NR applies energy from (B+) to the initiating circuits for the routes originating at that location. More specifically the preselecting relay 3Y is energized by a circuit closed from (B+), and including front contact 193 of relay 11NR, back contact 194 of relay 11XR, front contact 195 of track relay 3TR, back contact 196 of relay 2R, wire 197, back contact 198 of relay 3R, windings of relay 3Y, to (CN). The picking up of the relay 3Y causes energy to be passed on from its left-hand terminal through front contact 199, front contact 200 of track relay 4TR, back contact 201 of relay 4R, wire 202, back contact 203 of relay 13XR, back contact 204 of relay 15CNR, back contact 205 of relay 15NR, back contact 206 of relay 15XP, rectifier unit 207, windings of relay 15NP, to (CN). When the entrance repeating relay 15NP picks up, it closes its front contact 208 to shunt the contacts 205 and 206 for purposes hereinafter pointed out.

The picking up of the entrance relay 11NR also applies energy to the preselecting relay 4BY through a circuit from (B+), and including front contact 193 of relay 11NR, back contact 194 of relay 11XR, front contact 195 of relay 3TR, back contact 210 of relay 2AN, back contact 211 of relay 2BN, back contact 212 of relay 2BY, front contact 213 of relay 9TR, wire 214, back contact 215 of relay 4R, windings of relay 4BY, to (CN). The response of the relay 4BY opens back contact 216 to prevent the flow of energy over the initiating circuit corresponding to the crossover 4 in reverse position, and the closure of front contact 216 of relay 4BY passes energy on through front contact 217 of track relay 10TR, wire 218, back contact 219 of relay 14XR, back contact 220 of relay 16CNR, back contact 221 of relay 16NR, back contact 222 of relay 16XP, rectifier unit 223, windings of relay 16NP, to (CN). The picking up of front contact 224 of relay 16NP closes a shunt circuit around the contacts 221 and 222 for purposes hereinafter described.

From the above description, it will be seen that the initiating circuits act to preselect the optional routes within its own group the same as if no through route were contemplated. This will be discussed in greater detail hereinafter.

The picking up of an entrance repeating relay, such as relay 15NP, for example, for each signal location which may become an intermediate signal location in some through route, acts to apply energy to the initiating circuits for each of the routes originating at the corresponding signal location.

More specifically the relay 15NP applies energy to the preselecting relay 6AY from (B+), through a circuit including front contact 225 of relay 15NP, back contact 226 of relay 15CNR, back contact 227 of relay 13NP, back contact 228 of relay 15XR, wire 229, front contact 230 of track relay 5TR, wire 231, back contact 232 of relay 5R, back contact 233 of relay 6R, winding of relay 6AY, to (CN).

The picking up of front contact 234 of relay 6AY passes energy on through front contact 235 of track relay 6TR to the left-hand terminal of the exit relay 17XR.

If it were not for the fact that the entrance repeating relay 16NP is also energized, the energy which is supplied from the front contact 225 of the relay 15NP would also flow through the back contacts 236 and 237 of relays 5AN and 5BN over a circuit corresponding to the crossovers 5 in a reverse position to thus condition the exit relay 18XR. But the entrance repeating relay 16NP is also energized which causes the preselecting relay 5BY to be energized opening back contact 238 to prevent such conditioning. This energization of the preselecting relay 5BY is effected over a circuit closed from (B+), and including front contact 239 of relay 16NP, back contact 240 of relay 16CNR, back contact 241 of relay 14NP, back contact 242 of relay 16XR, wire 243, back contact 244 of relay 5R, windings of relay 5BY, to (CN).

The picking up of the relay 5BY closes front contact 238 to pass energy on through front contact 245 of track relay 11TR, front contact 246 of track relay 12TR, back contact 247 of relay 6R, to the left-hand terminal of the exit relay 18XR.

Thus, the operator may actuate the exit button for any one of the extreme exit locations or any one of the intermediate signal locations. For example, the operator may actuate the exit button 13XB and cause the application of (CN) to the relay 13XR through back contact 248, back contact 249 of relay 15XR, back contact 250 of relay 13CNR, back contact 251 of relay 13NR, back contact 252 of relay 13NP, to the right-hand terminal of relay 13XR. Such completion of an energizing circuit would cause the relay 13XR to pick up and close its front contact 253 to shunt out the circuit just traced and cause the relay 13XR to be dependent upon the entrance relay 11NR.

The picking up of the exit relay 13XR closes front contact 278 to effect the completion operation in a manner similar to that described in detail for the route 13 to 11. This of course effects the energization of the primary switch control relays 4AN, 3N and 2AN in succession in accordance with the preselection operation performed by the initiating circuits. The picking up of the relays 4AN and 2AN opens contacts 66 and 210 respectively which deenergizes the relays 4BY, 16NP and 5BY. In other words, the completion operation opens the initiating circuits for all conflicting routes.

The picking up of the exit relay 13XR also opens back contact 203 to deenergize the entrance repeating relay 15NP which in turn deenergizes the initiating circuits for the adjoining interlocked group.

On the other hand, the operator may actuate the exit button 17XB instead of the exit button 13XB, which applies (CN) through contact 254, back contact 255 of relay 17CNR, back contact 256 of relay 17NR, to the right-hand terminal of relay 17XR to complete its energizing circuit. When the relay 17XR picks up and closes front contact 257, (CN) is applied to the right-hand terminal to shunt out the circuit just traced and cause the relay 17XR to be dependent upon the relay 15NP, which is in turn dependent upon the entrance relay 11NR until the completion operations for the through route have taken place, as will be presently described.

Similarly, the operator might choose to actuate the exit button 14XB or the exit button 18XB instead of either of the buttons 13XB or 17XB. This of course all depends upon the particular route or through route which the operator desires to establish. As the operation in response to these buttons 14XB and 18XB is the same as the operation in response to buttons 13XB and 17XB, it will not be described in detail.

*Completion operation*

Let us assume that the operator has designated the signal 11 as an entrance point for some through route and has followed this operation by the actuation of the exit button 17XB to cause the establishment of a through route between such points. The picking up of the exit relay 17XR, as above described, causes the relay 6AN to be energized over a circuit from (+), through front contact 258 of relay 17XR, front contact 259 of the preselecting relay 6AY, upper winding of the relay 6AN, to (—).

The picking up of the relay 6AN closes front contact 260 to pass energy on through front contact 261 of relay 6AY, back contact 262 of relay 5AY, upper winding of relay 5AN, to (—).

The picking up of the relay 5AN closes front contact 263 to pass energy on through back contact 264 of relay 5AY, wire 265, winding of exit repeating relay 15XP, back contact 266 of relay 15XR, to (—).

The picking up of the relay 15XP opens contact 206 for the entrance repeating relay 15NP but as already pointed out this contact 206 is shunted by front contact 208 so that the relay 15NP is still maintained energized.

*Automatic through route build-up operation at intermediate signal location*

As above mentioned, when a through route is to be built up, the entrance and exit operations at one or more intermediate signal locations are automatically performed so that no manual operation is required. This operation is also performed in a manner to render the subsequent restoration of the associated signal to stop entirely dependent upon manual restoration if no train goes past that signal location, but so arranged that if a train passes or accepts that signal, it automatically is restored to stop.

The picking up of the relay 15XP, for example, closes a pick-up circuit for the entrance relay 15NR from (+), and including front contact 267 of relay 5TR, normal contact 268 of entrance button 15NB, front contact 269 of relay 15XP, front contact 270 of relay 15NP, windings of relay 15NR, back contact 271 of relay 13CNR, back contact 272 of relay 13NR, to (—). As soon as the relay 15NR picks up, it closes front contact 273 to shunt out the contacts 269 and 270 so that when the through route is established this relay 15NR is entirely dependent for restoration upon the track contact 267 and the entrance button contact 268.

As soon as the entrance relay 15NR picks up, it closes an energizing circuit for the exit relay 13XR by applying (CN) through front contact 275 of entrance relay 15NR, contact 276 of exit repeating relay 15XP, contact 277 of entrance repeating relay 15NP, back contact 249 of relay 15XR, back contact 250 of relay 13CNR, back contact 251 of relay 13NR, back contact 252 of relay 13NP, to the right-hand terminal of the exit relay 13XR. The picking up of the relay 13XR of course closes its stick circuit at front contact 253 to render this relay 13XR entirely dependent upon the entrance relay 11NR.

The picking up of the exit relay 13XR opens its back contact 203 which in turn deenergizes the entrance repeating relay 15NP which of course opens the pick-up circuit for the entrance relay 15NR at front contact 270 and also opens the pick-up circuit for the exit relay 13XR at front contact 277.

It is also noted that the picking up of the relay 15NR opens its back contact 205 prior to the picking up of the exit relay 13XR, but such operation does not drop the relay 15NP until back contact 203 of 13XR is open because the front contact 208 of the relay 15NP shunts contact 205. This arrangement of contacts 205 and 206 is provided to prevent the energization of the relay 15NP whenever the signal 15 is an entrance point for some route and to continue such prevention until that route has been restored to stop by the dropping of its associated exit relay as repeated into the exit repeating relay 15XP.

The picking up of the exit relay 13XR continues the completion operation by energizing relay 4AN over a circuit closed from (+), and including front contact 278 of relay 13XR, wire 279, back contact 61 of relay 4AY, winding of relay 4AN, to (—).

The picking up of the relay 4AN closes front contact 62 to pass energy on through back contact 63 of relay 4AY, front contact 79 of relay 3Y, winding of relay 3N, to (—).

The picking up of the relay 3N closes front contact 80 to pass energy on through front contact 81 of relay 3Y, wire 289, back contact 75 of relay 2AY, windings of relay 2AN, to (—). It might be noted that, if the signal location 11 were to be an intermediate signal location in some through route, an exit repeating relay XP would also be provided and would be energized upon the picking up of the relay 2AN, but inasmuch as such signal is considered to be at the entrance to the interlocking plant, such a relay is not required.

The energization of the primary switch control relays 6AN, 5AN, 4AN, 3N and 2AN of course causes the operation of their corresponding track switches, as typically described above, to establish the route. These relays also open the initiating circuits for all conflicting routes. The picking up of the relay 2AN opens back contact 210 so as to deenergize the preselecting relay 4BY and the entrance repeating relay 16NP. The deenergization of the relay 16NP in turn deenergizes the preselecting relay 5BY.

The operation of the track switches in each of the interlocked groups forming a part of the through route causes the clearing of the entering signal for each group in the same manner as described above for the individual interlocked group. For the through route under consideration, signals 11A and 15A are cleared. In other words, the clearing of signals and the locking of a route for any interlocked group remains the same for a through route as it does for merely a route set up within a single interlocked group.

Restoration of through route

With the signals 11A and 15A cleared, a through route is set up from signal 11 to signal 17. If a train accepts the signal 11 and proceeds toward the signal 15, the signal 11 is of course automatically restored to stop and the route locking is effective while the train is in the route between 11 and 15, as above typically described. Then when the train passes the signal 15, that signal is also automatically put to stop and the route locking between signals 15 and 17 is effective while the train is in the route as above typically described in connection with the route locking of Fig. 4 for the other interlocked group. In other words, the passage of a train over the various component parts of a through route restores the signals automatically as the train passes each of the signals.

On the other hand, if a train does not pass over the through route, the operator must restore each signal at stop individually. He may do this in any order that he desires, inasmuch as each signal is individually controllable.

In connection with the restoration of a component part of a through route, it should be noted that the exit repeating relays XP are provided to assure that a route will be restored and its exit relay released even though a conditioning and preselecting operation is being performed in an adjoining interlocked group. For example, let us assume that the entrance relay 15NR is picked up and a route is established between the signals 15 and 17. Under these conditions the exit relay 17XR is picked up which is also repeated by the relay 15XP. This opens back contact 206 of relay 15XP so that any energization of the initiating circuits for routes terminating at this signal 15 prevents the entrance repeating relay 15NP from picking up.

In other words, if the entrance relay 11NR is picked up positive energy (B+) is applied to contact 193 which would pick up the entrance repeating relay 15NP until after the exit relay 13XR had been picked up by the actuation of the exit button 13XB. Assuming that the exit relay 13XR is not picked up, but the relay 15NP is picked up (disregarding contact 206 of 15XP for the purpose of explanation), then the front contact 225 of relay 15NP applies positive potential (B+) in multiple with contact 337 of relay 15NR to the initiating circuits for routes originating at such entrance point. Under the circumstances being considered, the route is set up to signal 17. Thus, if the entrance relay 15NR is released either automatically or manually, the exit relay 17XR would fail to release because of this energy from front contact 225. This would maintain the route between signals 15 and 17 irrespective of the release of the entrance relay 15NR.

However, the provision of an exit repeating relay such as relay 15XP and contact 206 prevents the energization of an entrance repeating relay such as relay 15NP, for example, unless such entrance repeating relay is required for the establishment of a through route.

This operation is not only useful with the manual restoration of the entrance relay 15NR so as to assure that the route which it governs will be released even though conditioning energy is on the initiating circuit for a route of an adjoining interlocked group, but this feature is also useful upon the automatic release of routes by a train entering such route. This is particularly true inasmuch as an operator may be manipulating the control buttons to establish various routes at the same instant that a route is becoming occupied by a train in an adjoining interlocked group.

It should be noted that the inclusion of track relay contacts in the initiating circuits in accordance with the present invention also acts to prevent initiating energy from picking up the entrance repeating relay under the circumstances just assumed. That is, a train on the track section 4T prevents the flow of (B+) energy over the initiating circuits past the rectifier unit 209 for setting up a high speed route, which results in the prevention of the conditioning of the exit relay 13XR and the entrance repeating relay 15NP. However, a very short train might pass from the track section 4T to the track section 5T so rapidly as to permit the front contact 200 of the track relay 4TR to be closed before the exit relay 17XR, for example, could be released, and under such circumstances the exit repeating relay 15XP acts to control the operation of the entrance repeating relay 15NP to assure the release of the exit relay 17XR upon the release of the entrance relay 15NR.

Effect of train presence on through route operation

It will be noted from the above description that, to establish through routes, the entering signal must be designated for governing a high speed signal. This is effected by the application of positive potential (B+) which flows through the rectifier unit associated with the entrance repeating relay NP, but if the opposite potential (B—) is applied by the operation of the entrance button for governing a low speed signal, the entrance repeating relay NP cannot be energized due to the blocking effect of the associated rectifier or asymmetric unit.

This operation is desired to prevent accidentally clearing a high speed signal when a low speed switching movement is intended. For example, a train may be standing on the track section 4T awaiting the clearing of signal 15A, but prior to the clearing of such signal, it is desired to perform a switching movement at the rear of such train. The operator actuates the entrance button 11NB to clear the signal 11B, but by mistake actuates the exit button 17XB. If it were not for the fact that the entrance repeating relay 16NP is prevented from picking up under such circumstances, the signal 15A would be cleared as well as the signal 11B. This operation will be best understood by considering in detail certain of the conditions involved.

For example, with a train on the track section 4T in the route from signal 13 to signal 11, the front contact 200 of track relay 4TR (see Fig. 1B) is open so that the operation of the entrance button 11NB to a rotated position to pick up the relay 11CNR and apply (B—) to the initiating circuit fails to pick up the entrance repeating relay 15NP. This is because the rectifier unit 207 (see Fig. 1C) will not allow (B—) energy to flow through it. Thus, a switching movement planned for this train on track section 4T cannot cause the energization of entrance repeating relay 15NP and permit the establishment of a through route if the operator should actuate the exit button 17XB.

On the other hand, if the operator actuates the entrance button 11NB to pick up the entrance relay 11NR and apply (B+) energy to the initiating circuits, such energy cannot condition the exit relay 13XR with the track relay contact 200 opened, because the rectifier unit 209 prevents such flow of energy.

In other words, the track relay contacts and their rectifier units located in the initiating circuits in accordance with the present invention, together with polarized control of the initiating circuits, allows a high speed signal to be cleared for a route only when that route is unoccupied, but permits the establishment of the route and the clearing of the low speed signal even though such route is occupied. The rectifier units associated with the entrance repeating relays NP together with the polarization of the initiating circuits, as described, permits through routes to be established only when the entrance points have been designated to be governed by high speed signals. In brief, a through route cannot be set up over a track section occupied by a train. This protective feature is provided in an interlocking system in such a way that it cooperates with the rear release route locking in a manner to take full advantage of such rear release locking.

For example, let us assume that a train has passed the signal 14A towards the signal location 12. When this train is wholly on the track section 9T, the crossover 4 is released by the route locking for operation and a through route might well be established from the signal 11 to the signal 18. Although the rear release route locking will permit such operation, the track contacts and rectifier units are so located in the initiating circuits as to prevent the setting up of a through route from the signal 12 to the signal 18.

More specifically, the train on the track section 9T opens front contact 213 of the track relay 9TR so that any (B+) energy from the contact 283 of the entrance relay 12NR cannot flow past the rectifier unit 281 to condition the exit relay 14XR. Also, the application of (B—) energy through front contact 282 of call-on entrance relay 12CNR cannot energize the entrance repeating relay 16NP because of the rectifier unit 223 associated therewith.

However, with the train on the track section 9T, the primary switch control relay 2BN is maintained energized, in a manner typically described in connection with Fig. 2, so that back contact 211 is open. But the entrance relay 11NR when picked up by the actuation of its entrance button 11NB, applies (B+) energy through the initiating circuits for the route via crossover 4 and energizes the relay 16NP. The relay 16NP passes energy on to effect the conditioning of the exit relay 18XR and permit the establishment of a through route from signal 11 to signal 18 although a train is on the track section 9T.

Automatic optional route selection

From the above description, it will be understood that the system of the present invention involves the principle of preselection applied to alternative routes so that the most superior of a number of alternative routes is established if that superior route is available, but in the event that such route is not available, the next alternative route in order of superiority is then established. This principle of preselection applied to alternative routes to automatically select such alternative routes in a predetermined order of preference has been previously disclosed in the patent to A. Langdon, No. 2,265,240, dated December 9, 1941. This prior patent also shows this principle of operation applied to through route control. However, the present invention involves the use of track relay contacts in the initiating circuits so that these track contacts also act on the preselection operation to automatically determine when a route is available for use.

With reference to Fig. 3, there are three alternative routes between signals 11 and 18. The route via the crossover 2 reversed is the most superior route and routes via crossovers 4 and 5 being more inferior routes and having a relative superiority in the order named. This relative superiority is for traffic from left to right, and the order of superiority is exactly the reverse when traffic from right to left is considered.

If a train has entered a route from signal 12 to signal 16, but is still standing on the track section 10T, it is obvious that the crossover 2 has been released for operation by the rear release route locking. Thus, it would appear that the through route from signal 11 to signal 18 could be established automatically via crossover 2 reversed, but as above pointed out the opening of front contact 217 of the track relay 10TR prevents (B+) energy from flowing over the initiating circuits to pick up the entrance repeating relay 16NP so that no through route can be built up under the train although the crossover 2 is available for use. The alternative route which is available for use is the one including the crossover 5 reversed.

It is desired to point out that the present invention provides this automatic selection of optional routes irrespective of where the train is located in a through route. In other words, there might be a larger number of track sections between the signals 11 and 16 than the number shown, and the train might be located on one or more of the intermediate track sections, so that the designation of signal 11 as an entering point would apply positive energy (B+) to the initiating circuits, which energy would be prevented from passing over initiating circuits for the corresponding intermediate track section or sections. This would act upon the initiating circuits to cause the preselection operation for some other alternative route than the one including the track section occupied by the train.

It should be noted that an alternative route including a train may be set up for a low speed signal. For example, the train on track section 10T does not block (B−) energy at contact 217 because of rectifier unit 286, so that the route from signal 11 to signal 16 is set up via crossover 2 when 11NB is operated for a low speed signal followed by the actuation of 14XB.

In brief, it is to be understood that the present invention contemplates that the use of track contacts and suitable polarity selective shunting means in the initiating circuits which is particularly adaptable to an entrance-exit type of interlocking system as shown and described, inasmuch as such arrangement not only prevents the establishment of through routes when such through routes are not desired, but also serve to automatically select the optional routes and through routes when they are available for use.

*Modifications*

The embodiment of the invention disclosed in Figs. 1A–1E employs a track relay contact and rectifier unit for each track circuit of the track layout to control the initiating circuits in accordance with traffic conditions, but it is to be understood that other specific means may be employed to accomplish similar control of the initiating circuits and still come within the scope of the invention. Two other forms have been shown. One modified form shown in Figs. 7A and 7B employs a rectifier and a relay in combination with each track contact included in the initiating circuits in such a manner that the rectifiers for the initiating circuit for any one route are in multiple instead of in series as in Figs. 1A–1E. Although this arrangement has been shown in separate initiating circuits and in combination with a modified form of completion circuits, it is to be understood that this form of control may be employed with the initiating and completion circuits of Figs. 1A–1E.

Figure 7A:
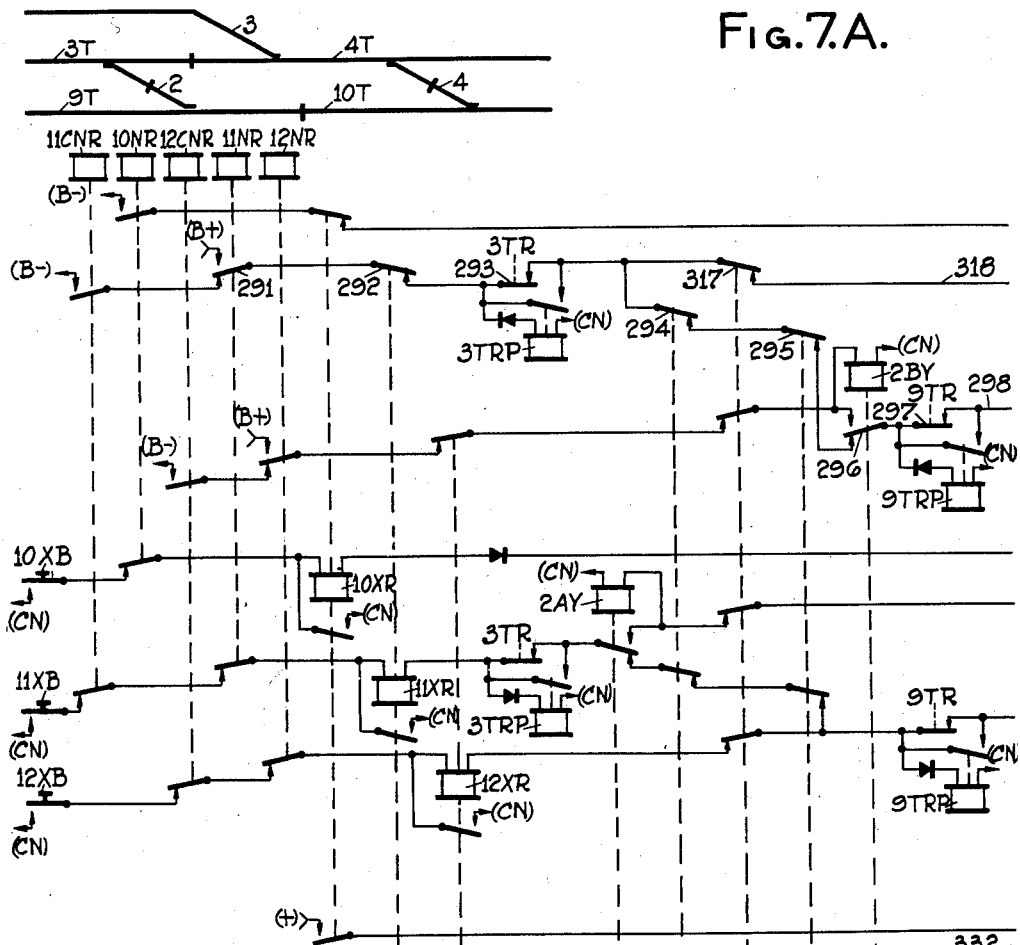
Figure 8:
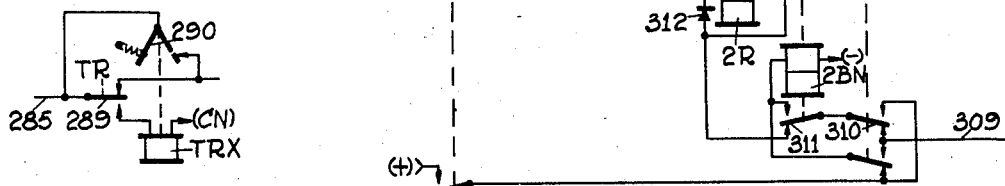
Fig. 8 illustrates a modified form of the polarity responsive devices associated with certain track relay contacts.

Another modified form shown in Fig. 8 gives an abbreviated illustration of a single track contact in combination with a polarized relay, which unit may be substituted for the corresponding units shown in Figs. 7A and 7B or in Figs. 1A–1E. This form shown in Fig. 8 uses a biased to one position polarized relay TRX which is energized over an initiating circuit to actuate its polar contact 290 to the right only when the associated track contact 289 is deenergized and the initiating circuit is energized with negative potential (B−). In other words, when the back contact 289 is closed due to the deenergized condition of its track relay TR, and the initiating circuit wire 285 is energized with (B−) energy to clear a call-on or low speed signal, the relay TRX actuates its contact 290 to the right to shunt the open front contact 288 of relay TR. This permits the clearing of the call-on signal in the same manner as described in connection with Figs. 1A–1E where the rectifier unit, such as 284, shunts the track contact 195 of the track relay 3TR to permit negative potential (B−) to flow. In this form of Fig. 8, the reenergization of the track relay TR of course deenergizes the relay TRX, but its contact 290 is no longer required to be in a right-hand position under such circumstances as front contact 289 shunts it out. The application of (B+) to the initiating circuit wire 285 while the back contact 289 is closed, merely causes the contact 290 to be more strongly actuated towards is biased position. Thus, (B+) energy for a high speed signal can not be passed on to the right to condition one or more exit relays.

Referring now to the form of the invention shown in Figs. 7A and 7B, it has been thought desirable to point out how a route can be preselected and established with this form of the present invention so as to more clearly point out the completion operation involved in such operation.

Let us assume that the operator desires to establish a route between signals 11 and 14. He designates the signal 11 as an entrance point for a high speed signal and picks up the entrance relay 11NR as pointed out in connection with Figs. 1A–1E. With relay 11NR picked up, energy flows from (B+), through a circuit including front contact 291 of relay 11NR, back contact 292 of relay 11XR, front contact 293 of relay 3TR, back contact 294 of relay 2AN, back contact 295 of relay 2BN, back contact 296 of relay 2BY, front contact 297 of relay 9TR, wire 298, back contact 299 of relay 4R, windings of relay 4BY, to (CN).

Picking up of the relay 4BY passes energy on through front contact 300, front contact 301 of track relay 10TR, to the left-hand terminal of the exit relay 14XR. The operator can then actuate the exit button 14XB and apply (CN) to the right-hand terminal of the exit relay 14XR through back contact 302 of exit button 14XB, back contact 303 of the entrance relay 14NR, through suitable selections XXX typically shown in Figs. 1A–1E, to the right-hand terminal of the exit relay 14XR. When the exit relay 14XR picks up, it applies (CN) through its front contact 304 through its right-hand terminal so as to remain stuck up dependent upon the initiating circuit.

The picking up of the exit relay 14XR effects the completion operation by energizing the relay 4BN from (+), through a circuit including front contact 305 of exit relay 14XR, front contact 306 of relay 4BY, windings of relay 4BN, to (−). When the relay 4BN picks up, it passes energy on through front contact 307, front contact 308 of relay 4BY, wire 309, back contact 310 of relay 2BY, back contact 311 of relay 2BN, rectifier unit 312, windings of relay 2R, to (−).

When the primary switch control relay 2R picks up, it closes front contact 313 to shunt the rectifier units 312 and 314 to pass energy on to any exit repeating relay XP that might be employed (none being shown as it is assumed that this is the end of the interlocking plant as explained in connection with Figs. 1A–1E). These primary switch control relays initiate the operation of their switches to the proper positions for establishing the route.

The above explanation assumes that there is no train in the desired route or any route conflicting therewith. If a train is standing on the track section 10T, that opens front contact 301 of track relay 10TR so that positive energy (B+) could not flow over this initiating circuit to condition the exit relay 14XR. However, if the operator actuates the entrance button 11NB so as to energize the call-on entrance relay 11CNR to apply (B−) energy to the initiating circuits, then that energy flows over the circuit as above pointed out until it gets to front contact 300 of relay 4BY and from there it flows through the rectifier unit 315, windings of relay 10TRP, to (CN). This energizes the relay TRP and causes it to close front contact 316 which shunts the open front contact 301 of the track relay 10TR and permits the exit relay 14XR to be conditioned for energization upon the actuation of the exit button 14XB. It will be understood in this connection, that this negative potential (B−) has been thus placed upon the initiating circuits to permit a switching train movement in connection with the train standing on the track section 10T. This negative energy (B−) does not permit the establishment of a through route because such negative potential (B−) cannot flow to the associated entrance repeating relay 16NP by reason of its associated rectifier unit. This connection of relay 16NP has not been shown specifically in the circuits of Figs. 7A and 7B for the sake of simplicity, but it is to be understood that these circuits of 7A and 7B may be used in place of similar circuits of Figs. 1A–1E and in connection with the through route control as described therein (this train standing on the track section 10T is assumed to have entered over this same alternative route via crossover 2 from either direction).

Let us assume that a train is standing on the track section 9T having passed over the route from signal 14 to signal 12. This causes the relay 2BN to be maintained energized as typically described in connection with Fig. 2. With the relay 2BN picked up, back contact 295 is maintained open so that the actuation of the entrance button 11NR and the application of (B+) energy to the initiating circuits causes the preselection of the alternative route including the crossover 4.

More specifically, the relay 11NR applies (B+) energy to the initiating circuit including a circuit for the relay 3Y from (B+), through a circuit including front contact 291 of relay 11NR, back contact 292 of relay 11XR, front contact 293, track relay 9TR, back contact 317 of relay 2R, wire 318, back contact 319 of relay 3R, windings of relay 3Y, to (CN). The picking up of the relay 3Y passses energy on through front contact 320, front contact 321 of track relay 4TR, back contact 322 of relay 4AN, back contact 323 of relay 4BN, back contact 300 of relay 4BY, front contact 301 of track relay 10TR, to the left-hand terminal of the exit relay 14XR.

The picking up of the relay 14XR in response to the actuation of the exit button 14XB, as above described, causes the relay 4R to be energized over a circuit closed from (+), and including front contact 305 of relay 14XR, back contact 308 of relay 4BY, back contact 307 of relay 4BN, rectifier unit 324, windings of relay 4R, to (−).

As soon as the relay 4R picks up, it closes front contact 325 to shunt the rectifier units 324 and 326 so as to pass energy on from the left-hand terminal of relay 4R through back contact 327 of relay 4AN, back contact 328 of relay 4AY, front contact 329 of relay 3Y, windings of relay 3N, to (−).

As soon as the relay 3N picks up, it closes front contact 330 to pass energy on through front contact 331 of relay 3Y, wire 332, back contact 333 of relay 2AY, windings of relay 2AN, to (−).

This picking up of the relays 4R, 3N and 2AN causes the operation of the track switches as above typically described in connection with Fig. 2 and the signals may clear in accordance with the designation of a high speed signal as typically described in connection with Fig. 3. It is, of course, understood that the positive energy (B+) which is supplied to the exit relay 14XR may be passed on to the entrance repeating relay 16XP so that a through route may be established if desired.

It is thus seen that the completion network of this form of the invention effects the completion operation in a manner similar to that pointed out in connection with Figs. 1A–1E, the difference being that the same wires interconnecting the groups of primary switch control relays may be used for the completion operation in both directions and the circuits employed in connection with the control of the reverse primary switch control relays is somewhat simplified by the use of the rectifier units.

In order to point out how the same circuits are used to effect the completion operation for the route in the opposite direction including the crossover 4, it will be assumed that the preselection operation has taken place energizing the relay 2AY and that the exit relay 11XR has been picked up.

Assuming the exit relay 11XR to be picked up, energy from (B+) is supplied through front contact 334, front contact 333 of relay 2AY, windings of relay 2AN, to (−).

The picking up of the relay 2AN closes front contact 335 to pass energy on through front contact 336 of relay 2AY, wire 332, back contact 329 of relay 3Y windings of relay 3N, to (−).

The picking up of the relay 3N closes front contact 330 to pass energy on through back contact 331 of relay 3Y, back contact 328 of relay 4AY, back contact 327 of relay 4AN, rectifier unit 326, windings of relay 4R, to (−).

When the relay 4R picks up, it closes front contact 325 to shunt the rectifier units 326 and 324 to pass energy on for the energization of any exit repeating relay XP which may be employed, as typically shown in Figs. 1A–1E, it being understood that these circuits shown in Figs. 7A and 7B may be suitably substituted in the corresponding circuits of Figs. 1A–1B. It may be stated here that the closure of front contact 325 of the primary switch control relay 4R, for example, does shunt both of the rectifier units 326 and 324 to exclude them from the circuit, but the shunting of the rectifier unit 324 is the only one required to be shunted to pass energy on to cause the cascade completion operation for this direction of route establishment. When the route is to be established in the opposite direction, as above pointed out, then the rectifier unit 326 needs to be shunted in order to pass the energy on after the response of the primary switch control relay 4R. Thus, the circuit is somewhat simplified by providing by a single contact, such as 325, to shunt both of the rectifier units irrespective of the direction in which the route is being completed.

SUMMARY

The interlocking system of the present invention thus embodies several operating features which give the greatest possible safety in the operation of the system and at the same time provide the greatest possible facility in the operation of trains through the track layout. This is especially true with respect to the through route operation employed in connection with the embodiment of the present invention. It has been most desirable in the past to provide that through routes may be established in an entrance-exit type of interlocking system by merely designating the extreme entrance and exit points of such through routes, but until the present invention means has been lacking to provide a fully protected type of through route manipulation so as to prevent the building up of a through route over a section occupied by a train and at the same time permit the clearing of low speed signals for switching movements in connection with such train. Not only has this feature of operation been provided, but it has been shown in combination with route locking of the rear release type so as to take full advantages of such rear release route locking to facilitate the greatest number of train movements possible within a given time over the track layout.

Although the present invention has been shown applied to a particular type of entrance-exit type of interlocking system, it is desired to be understood that the principles involved may be applied to other types of control systems and still be within the scope of the present invention.

The present embodiment of the invention has of necessity been shown and described in this disclosure in connection with a particular track layout and a particular arrangement of signals and switches, but it is to be understood that the various novel features of the present invention can be applied to all types of track layouts, switch and signal arrangements encountered in practice.

The entire system as provided by the present invention can also be divided into a number of subcombinations, each of which may be applicable for use with other entrance-exit systems. For example, some interlocking plants are provided with either high speed signals or semi-automatic dwarf signals to permit train movements over routes which are unoccupied but are not provided with call-on signals to permit train movements into routes that are occupied by trains. In such cases, the present invention is particularly adaptable in that the track relay contacts may be included in the initiating or conditioning circuits to prevent the establishment of an occupied route without the provision of any rectifier or equivalent means to shunt such contacts for the opposite polarity of energization. In other words, no route could have its route establishing means actuated and a signal cleared therefor if such route should be occupied by a train. This operation is clearly present in the present disclosure with regard to the high speed signal control, the only difference being that call-on or low speed signal control would be omitted.

Having thus described one specific embodiment of the present invention and certain typical operations of this embodiment, it is desired to be understood that this form of the invention is selected to facilitate in the disclosure of the invention rather than to limit the number of forms that the invention may assume and that the operations of the system should not be limited to the typical operations but should be considered to include all the operations which the embodiment of the invention may perform when applied to actual practice; and it is to be further understood that various modifications, adaptations and alterations may be applied to the specific form shown to meet the requirements of practice without in any manner departing from the spirit or scope of the present invention except as limited by the appended claims.

What we claim is:

1. In a switch and signal control system of the entrance-exit type for governing the power operation of the track switches of a track layout to set up the different routes between entrance and exit points, said entrance points having both high and low speed signals for governing traffic over the routes originating at such points, control buttons associated with the entrance and exit points of the track layout, said control buttons for the entrance points being manually operable to either of two different operated positions corresponding to the high and low speed signals respectively from a non-operated position, initiating circuits energized with potential of one polarity or the other upon the actuation of the control button for any given entrance point to one operated position or the other respectively to designate a desired entrance point for preselecting the position of the switches included in the various available routes originating at the designated entrance point and for supplying a potential to the control button for the exit end of any one of such available routes, track circuits for the track layout and associated track relay means governed thereby, said track relay means being provided with track contacts included in said initiating circuits to prevent the supply of a potential of said one polarity to the control button belonging to the exit end of any route originating at the designated entrance point which is occupied by a train, circuit means for shunting each track contact in said initiating circuits with respect to potential of said other polarity only, completion circuit means controlled in accordance with said preselection operation of said initiating circuits upon the actuation of the control button for any particular one of such routes provided such control button is supplied with a potential to thereby cause the operation of the track switches to establish that particular route, and signal control circuits controlled by said completion circuit means and the control buttons for the entrance and exit ends of any established route for clearing said high speed signal for the entrance end of such route providing the control button for that entrance point is in its one operated position, and for clearing the low speed signal for such entrance point provided the corresponding control button is in its other operated position.

2. In a switch and signal control system of the entrance-exit type, a track layout having a plurality of track sections including power operated track switches for establishing different routes between entrance and exit signal locations, a track circuit for each of said sections including a track relay, rear release route locking means controlled by said track relays for locking the track switches of the sections of any particular route in advance of a train moving through that route but releasing the track switches of the track sections of that route in the rear of such train, manually operable control buttons associated with the entrance and exit signal locations of the track layout, and route establishing means comprising initiating circuit means having portions corresponding to the track sections of said track layout with such portions including contacts of the corresponding track relays, said initiating circuit means acting in response to the actuation of the control button for any given entrance signal location to preselect the position of certain switches in the various establishable routes originating at that entrance location and for supplying a potential to the control buttons for the exit ends of only those of said establishable routes that are available for use because they are unoccupied or do not conflict with established routes or portions thereof still locked by said route locking means; completion circuit means including exit relay means initially responsive to the actuation of a control button for the exit end of any one of said available routes for operating the track switches in accordance with the preselecting operation performed by said initiating circuit means to thereby establish that particular route, and signal control circuits for said signals controlled by said completion circuit means and said control buttons so as to clear the signal at the entrance end of any established route.

3. In a switch and signal control system of the entrance-exit type, a track layout having a plurality of track sections including power operated track switches for establishing different routes between entrance and exit points, a track circuit for each of said sections including a track relay, high and low speed signals for each of said entrance points for governing traffic over the routes originating at such points, control buttons associated with the entrance and exit points of the track layout, said control buttons for the entrance points being manually operable to either of two different operated positions corresponding to the high and low speed signals respectively, initiating circuits energized with potential of one polarity or the other upon the actuation of the control button to one operated position or the other respectively for any given entrance point, for preselecting the position of certain switches included in the various available routes originating at the corresponding entrance point and for supplying a potential to the control button for the exit end of any one of such available routes, said initiating circuits including contacts of said track relays in portions of said initiating circuits corresponding to the respective track sections, to thereby prevent the supply of potential of said one polarity to the control button belonging to the exit end of any route having one or more track sections occupied by a train, a rectifier unit associated with each track contact for shunting that track contact with respect to potential of said other polarity only, completion circuit means responsive to the actuation of the control button for the exit end of any one of said available routes providing that button is supplied with a potential over said initiating circuits for such route for operating the track switches in accordance with the preselecting operation performed by said initiating circuits to thereby establish that particular route, and signal control circuits for said signals controlled by said completion circuit means and said control buttons so as to clear the high speed signal or said low speed signal at the entrance end of any established route depending upon whether the corresponding control button is operated to one position or the other, whereby a route can not be established and a high speed signal cleared therefor if such route is occupied by a train.

4. In a switch and signal control system of the entrance-exit type for track layouts affording one or more through routes over a plurality of adjoining interlocked groups past one or more intermediate signal locations, said system comprising manually operable buttons for designating the signal locations of said track layout as the entrance and exit ends of a desired route or through route, an entrance repeating relay for each signal location that may become an intermediate signal location in some through route, initiating circuit means associated with each interlocked group and energized by the operation of a button to designate as an entrance signal location any given signal location of that interlocked group for preselecting the position of the switches in all establishable routes originating at that signal location and for supplying energy to the control button for the exit end of such routes and at the same time energizing the corresponding entrance repeating relays for the signal locations at the ends of such establishable routes as may be included in some through route to in turn energize the initiating circuits for the adjacent interlocked group the same as if the control button for that signal location had been actuated to designate it as an entrance signal location, track circuits for the track layout each including a normally energized track relay having contacts included in corresponding portions of said initiating circuits to prevent the supply of energy to the control button or entrance repeating relay belonging to the exit end of any route occupied by a train, whereby the operation of the button to designate the entrance signal location of one or more through routes preselects the position of the trailed switches in the various interlocked groups involved in such through routes only providing no portion of any one of such through routes is occupied by a train, completion circuit means for each interlocked group effective upon the operation of the control button for an exit signal location thereof for governing the operation of the switches to establish a route over that interlocked group dependent upon the preselection operation performed by the energized initiating circuits, the operation of said completion circuit means to establish such a route rendering ineffective the initiating circuits relating to all other routes originating at the same entrance signal location, and means responsive to the completion of a route of an interlocked group from an exit point to an entrance signal location thereof for exercising an exit control for the corresponding signal location upon the completion circuit means of the adjoining interlocked group the same as if a control button had been actuated to designate that signal location as an exit end of a route.

5. In a control system for railroads, a track layout having at least one track section, a high speed signal and a low speed signal for governing traffic over said track section, a track relay associated with said track section, a circuit for clearing said high speed signal when energized with current of one polarity and for clearing said low speed signal when energized with current of the opposite polarity, and means controlled by said track relay for interrupting said circuit with respect to current of said one polarity and not current of said other polarity when said track section is occupied by a train.

6. In a control system for railroads, a track layout providing a plurality of different routes between an entrance signal location and one or more exit signal locations, said routes including in common at least one track section provided with a normally energized track relay, a high speed signal and a low speed signal at said entrance signal location for governing the traffic over said routes, a circuit for clearing said high speed signal when energized with current of one polarity and for clearing said low speed signal when energized with current of the opposite polarity, circuit means controlled by said track relay for interrupting said circuit with respect to said current of one polarity but not the current of the opposite polarity when said track section is occupied by a train, and manually operable control means for energizing said circuit with said one polarity or the other, whereby said high speed signal can be cleared only when the routes which it governs are not occupied by a train.

7. In a switch and signal control system of the entrance-exit type for track layouts including a plurality of interlocked groups and affording one or more through routes past one or more intermediate signals comprising, manually operable control buttons for the signal locations of said track layout which may be designated as the entrance or exit ends of some desired route, route establishing means responsive to the operation of said buttons for the entrance and exit ends of any given route or through route for establishing that route over one or more interlocked groups and for controlling the clearing of one or more signals in said route, said route establishing means including relay means associated with the various switches and initiating circuits for governing the selective energization of such relays, the operation of a control button for designating any given entrance signal location acting to energize said initiating circuits to cause the energization of said relay means associated with those switches in one or more interlocked groups including in some establishable route or through route originating at said designated entrance signal location, the initiating circuits relating to each of said routes but being effective only if that route is available for train movement and is not in conflict with some route then established, and track circuit controlled means for interrupting said initiating circuits relating to any route that is occupied by a train irrespective of the direction in which that train entered such route, to thereby prevent the establishment of any route or through route including the portion of the interlocked group occupied by such train.

8. In a switch and signal control system of the entrance-exit type for track layouts affording one or more through routes over a plurality of adjoining interlocked groups past one or more intermediate signal locations, each of said interlocked groups including a plurality of track sections provided with track circuits each having a track relay, an entrance repeating relay for each signal location that may become an intermediate signal location in some through route, initiating circuit means responsive to the actuation of a control button for the entrance end of any route or through route for energizing the entrance repeating relay for each signal location that may be an intermediate signal location in one of the through routes originating at such designated entrance point, said entrance repeating relays acting in turn to energize the initiating circuits for the adjoining interlocked group the same as if the control button for that signal location had been actuated to designate it as an entrance signal location, contacts of said track relays included in said initiating circuits so as to prevent the energization of the entrance repeating relay for any intermediate signal location which is the exit end of a route occupied by a train, said contact means acting independently of the direction that such train entered the associated track section, and route establishing means controlled by the actuation of a control button for the entrance end of the through route and the energization of the entrance repeating relay for any signal locations that may become intermediate signal locations for that particular through route for which the control button is actuated at the exit end thereof to thereby cause the power operation of the track switches and the clearing of the signals at the entrance ends of each of the interlocked groups providing a portion of the through route thus designated.

9. In a control system for railroads, a track layout having at least one track section, a high speed signal and a low speed signal for governing traffic over said track section, a track relay associated with said track section, a circuit for clearing said high speed signal when energized with current of one polarity and clearing said low speed signal when energized with current of the opposite polarity, said circuit including a front contact of said track relay for interrupting said circuit when said track section is occupied by a train, a rectifier unit for shunting said track contact to permit the flow of current of said other polarity even though said track section is occupied by a train, and manually operable means for energizing said circuit with said one polarity or the other, whereby said high speed signal can be cleared only when the track section is unoccupied, but said low speed signal can be cleared irrespective of such track occupancy.

10. In a control system for railroads, a track layout having at least one track section, a high speed signal and a low speed signal for governing traffic over said track section, a track relay associated with said track section, a circuit for clearing said high speed signal when energized with current of one polarity and clearing said low speed signal when energized with current of the opposite polarity, said circuit including a front contact of said track relay for interrupting said circuit when said track section is occupied by a train, a polarity responsive relay means energized in accordance with the polarity supplied to said circuit, a contact controlled by said polarity responsive relay means and included in a circuit for shunting said track contact when said circuit is supplied with current of said other polarity, and manually operable control means for energizing said circuit with said one polarity or the other.

11. In a control system for railroads, a track layout having at least one track section, a high speed signal and a low speed signal for governing traffic over said track section, a track relay associated with said track section, a circuit for clearing said high speed signal when energized with current of one polarity and clearing said low speed signal when energized with current of the opposite polarity, said circuit including a front contact of said track relay for interrupting said circuit when said track section is occupied by a train, a two-position polar relay having a polar contact biased to one position, a circuit for energizing said polar relay to its actuated position when said track relay is deenergized and said circuit for clearing said signal is energized with current of said opposite polarity, a circuit for shunting said track contact including said polar contact in an actuated position, and manually operable control means for energizing said circuit for clearing said signals with said one polarity or the other, whereby said low speed signal can be cleared independently of the occupied condition of said track section but said high speed signal can be cleared only when such section is unoccupied by a train.

12. In a switch and signal control system of the entrance-exit type, a track layout including a plurality of different routes between entrance and exit signal locations, said different routes being divided into track circuit sections each provided with a track relay, manually operable control buttons associated with each of said signal locations, preselecting relay means associated with said track switches, an initiating circuit network having circuit portions corresponding to the various track sections and including track contacts of the track relays for the corresponding sections and inter-connecting said preselecting relay means for the switches of said track layout, said initiating circuit network being responsive to the actuation of a control button to designate an entrance point to energize said preselecting relay means for certain switches in each of those routes originating at the corresponding entrance point providing such route is unoccupied and is not in conflict with some other established route or portion thereof, completion circuit means acting in response to the subsequent actuation of a control button to designate the exit end of one of those preselected routes and dependent upon said preselecting relay means for the switches of such route to cause the power operation of the switches as required to establish that route, and signal clearing circuits for clearing the signal at the entrance end of any established route dependent upon the manually operable control button for such entrance signal location and dependent upon said completion circuit means.

13. In a switch and signal control system of the entrance-exit type for governing the power operation of the track switches of a track layout to set up different routes between entrance and exit signal locations, said track layout including a plurality of track sections each having a normally energized track circuit including a track relay, manually operable control buttons associated with the entrance and exit signal locations of the track layout, initiating circuit means conforming to the routes of the said track layout and including contacts of said track relays at points corresponding to the locations of said track sections and also including preselecting relay means associated with said track switches, said initiating circuit means being energized in response to the actuation of any given entrance button to designate an entrance point for preselecting the position of the switches in the various routes originating at the corresponding entrance point and for supplying a potential to the exit button for each of those routes not occupied by a train or not in conflict with some other established route, completion circuit means including a stick relay for each exit point initially energized in response to the actuation of its associated control button to designate an exit point providing potential is supplied to such button, said completion circuit means being effective to cause the operation of the track switches for any desired route dependent upon said preselecting operation performed by said preselecting relay means to establish that route in response to the operation of the control buttons for its entrance and exit ends providing such route is unoccupied and is not in conflict with some other established route, and signal control circuits for said signals controlled by said completion circuit means and said control buttons so as to clear the signal at the entrance end of any established route.

14. In a switch and signal control system of the entrance-exit type, a track layout including a plurality of track switches to provide a plurality of different routes between entrance and exit signal locations, said different routes being divided into track circuit sections each provided with a track relay, manually operable control buttons associated with each of said signal locations, route establishing means responsive to the actuation of a button to designate an entrance point followed by the actuation of a button to designate an exit point of some desired route acting to cause operation of said track switches as required to establish that route and clear the signal therefor providing there is no conflict with some other established route or portion thereof, rear release route locking means associated with said route establishing means for maintaining an established route locked in advance of a train but releasing the switches of each section successively in turn as the train passes beyond such sections, and circuit means including contacts of said track relays acting on said route establishing means for preventing the establishment of any route having one or more of its track sections occupied by a train but permitting a conflicting route to be established as soon as the section including the switch at the point of conflict becomes unoccupied in the rear of a train.

15. In a switch and signal control system of the entrance-exit type, a track layout including a plurality of interlocked groups each divided into track circuit sections with track relays, said track layout affording at least two through routes past an intermediate signal between extreme entrance and exit signals, said interlocked group in advance of said intermediate signal providing two diverging routes with a particular one of such diverging routes having at least two track circuit sections, manually operable control buttons associated with each of the signal locations, route establishing means responsive to the operation of a button to designate an entrance point followed by the operation of a button to designate an exit point of a route or through route to cause the operation of the track switches as required to establish that route or through route and clear the signals therefor providing there is no conflict with some other established route, rear release route locking associated with said route establishing means for maintaining a route locked in advance of a train but releasing the switches of each section in turn as the train passes beyond such section, and circuit means including contacts of said track relays acting on said route establishing means for preventing the establishment of any route or through route having one or more of its track sections occupied by a train, but permitting a route conflicting with said particular route at the first track section in advance of said intermediate signal to be established as soon as that section becomes unoccupied although said second section is still occupied.

16. In a switch and signal control system of the entrance-exit type for track layouts including a plurality of interlocked groups and affording one or more through routes past one or more intermediate signals between extreme entrance and exit signals, each interlocked group of said track layout including a plurality of normally energized track circuits with each having a track relay, manually operable control buttons associated with each of the signal locations of the track layout which may be designated as the entrance or exit ends of some desired route or through route, initiating circuits for each interlocked group conforming to the routes of that group and including contacts of said track relays at points corresponding to the location of the respective track circuits in that group and also including preselecting relay means associated with the various track switches, said initiating circuits for each interlocked group being energized in response to the actuation of any given entrance button to designate an entrance point for preselecting the position of the switches in the various available routes originating at the corresponding entrance point and also supplying a potential to the control buttons for the exit ends of those routes provided such route is unoccupied and is not in conflict with some other established route, completion circuit means for each of said interlocked groups including a stick relay for each exit point initially energized in response to the actuation of its associated control button to designate an exit point provided potential is supplied to said button, said completion circuit means being effective to cause the operation of the track switches for any designated route dependent upon said preselecting operation performed by said preselecting relay means for the switches of that route, signal control circuits for clearing the signal at the entrance end of any established route dependent upon the control button for the corresponding entrance point, and through route circuit connections for inter-relating said initiation and completion circuit means for adjoining interlocked groups at each signal location that may become an intermediate signal in some through route to thereby permit the actuation of an entrance button for an entrance point followed by the actuation of the exit button for the exit end of some through route originating at such entrance point to cause the establishment of that through route and the clearing of the entering signal and each intermediate signal providing such through route is not in conflict with some other route or through route then established, and providing such through route or any portion thereof is not occupied by a train.

17. In a switch and signal control system of the entrance-exit type, a track layout including a plurality of different routes between entrance and exit signal locations, said different routes being divided into track sections each provided with a track relay, and said entrance signal locations having both high and low speed signals, control buttons associated with the entrance and exit signal locations of the track layout, said control buttons for the entrance signal locations being manually operable to either of two different operated positions, preselecting relay means associated with said track switches, an initiating circuit network having circuit portions corresponding to the various track sections and including track contacts of the track relays for the corresponding sections and interconnecting said preselecting relay means for the switches of said track layout, said initiating circuit network having energy of one polarity or the other applied thereto in response to the actuation of a control button to one position or the other respectively to designate an entrance point, to thereby energize the initiating circuits for those routes originating at the corresponding entrance point, relay means associated with each of said track contacts and connected to a corresponding portion of the initiating circuit network, said relay means being distinctively responsive to the polarity applied to such initiating circuits and effective to shunt its associated track contact when said other polarity is applied, completion circuit means acting in response to the subsequent actuation of a control button to designate the exit end of an available route and dependent upon said preselecting relay means for the switches of such route to cause the power operation of the switches as required to establish that route, and signal clearing circuits for clearing the high speed signal at the entrance end of an established route having its control button operated to one position and for clearing said low speed signal at the entrance to an established route having its control button operated to its other position, whereby any route may be established and its high speed signal cleared if such route is unoccupied and is not in conflict with some other established route, but whereby even an occupied route may be an established route and have its low speed signal cleared providing such route is not in conflict with some other established route.

18. In a switch and signal control system of the entrance-exit type for governing the power operation of the track switches in a track layout to set up the various routes between signal locations at opposite ends of the track layout for governing traffic over such track layout in both directions, freely movable control buttons associated with the signal locations of the track layout for designating the corresponding locations as entrance or exit points, initiating circuit means responsive to the actuation of any given entrance button for preselecting the position of certain switches included in the various available routes originating at the corresponding signal location and for supplying energy to the control buttons belonging to the exit end of said available routes, normal and reverse switch control relays for governing the power operation of each of said track switches, said relays each being provided with a single control winding, completion circuit means comprising a single wire extending between the normal and reverse switch control relays for adjoining switches, and the connection to each reverse relay being made through a pair of rectifiers so poled as to permit current to flow toward such relay but not away from such relay, and a front contact of each said reverse relay connected to shunt its associated rectifiers whenever it is picked up, said completion circuit means being initially rendered active in response to the actuation of a control button for the exit of a particular one of said available routes for energizing the control winding of each of those switch control relays required to establish said particular route, such energization being in accordance with said preselecting operation performed by said initiating circuit means, whereby said completion circuit means employs the same interconnecting wires between the groups of normal and reverse switch control relays for the different switches to energize the same control windings of such relays for either direction of traffic in any particular route.

ANDREW LANGDON.
FOREST B. HITCHCOCK.